United States Patent
Okuyama

(10) Patent No.: US 9,336,531 B2
(45) Date of Patent: May 10, 2016

(54) DOWNLOADING SYSTEM, AND UNIT, METHOD AND PROGRAM FOR THE SAME

(75) Inventor: Gen Okuyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1262 days.

(21) Appl. No.: 13/258,878

(22) PCT Filed: Mar. 3, 2010

(86) PCT No.: PCT/JP2010/001438
§ 371 (c)(1),
(2), (4) Date: Sep. 22, 2011

(87) PCT Pub. No.: WO2010/109776
PCT Pub. Date: Sep. 30, 2010

(65) Prior Publication Data
US 2012/0011027 A1 Jan. 12, 2012

(30) Foreign Application Priority Data
Mar. 25, 2009 (JP) .................................. 2009-074734

(51) Int. Cl.
*G06F 15/16* (2006.01)
*G06Q 30/02* (2012.01)
(Continued)

(52) U.S. Cl.
CPC ................ *G06Q 30/02* (2013.01); *G06F 9/445* (2013.01); *G06Q 30/0613* (2013.01)

(58) Field of Classification Search
CPC .... H04W 4/00; G06Q 30/02; G06Q 30/0613; G06F 9/445
USPC .................................. 709/217, 223, 219, 203
See application file for complete search history.

(56) References Cited

U.S. PATENT DOCUMENTS

| | | | | | |
|---|---|---|---|---|---|
| 5,606,600 | A | * | 2/1997 | Elliott ..................... | H04M 3/36 379/112.01 |
| 5,687,223 | A | * | 11/1997 | Elliott ..................... | H04M 3/36 379/112.01 |

(Continued)

FOREIGN PATENT DOCUMENTS

| JP | 11-312203 A | 11/1999 |
|---|---|---|
| JP | 2002358456 A | 12/2002 |

(Continued)

OTHER PUBLICATIONS

International Search Report for PCT/JP2010/001438 mailed May 18, 2010.

(Continued)

*Primary Examiner* — Frantz Jean

(57) ABSTRACT

Each of two or more terminals includes calling relationship transmission means which transmits calling relationship information regarding an application (or content data) to a management unit and download means which downloads an application. The management unit includes calling relationship statistics storage means which stores calling relationship statistical information generated based on the calling relationship information received from the terminals. An application server includes attribute generating means which generates attribute data, including information representing applications having high probabilities of being called up during the execution of an application as related applications, for each application managed by the application server based on the calling relationship statistical information. The download means further downloads an application based on the attribute data generated by the attribute generating means.

36 Claims, 12 Drawing Sheets

(51) Int. Cl.
*G06F 9/445* (2006.01)
*G06Q 30/06* (2012.01)

(56) References Cited

U.S. PATENT DOCUMENTS 8,060,470 B2 * 11/2011 Davidson .......... G06F 17/30306
707/634
8,856,309 B1 * 10/2014 Vazquez ............. G06F 11/3006
709/217
2005/0216421 A1 * 9/2005 Barry et al. ..................... 705/64

FOREIGN PATENT DOCUMENTS

| JP | 2003030037 A | | 1/2003 | |
| JP | 2004094411 A | | 3/2004 | |
| JP | 2005327036 A | | 11/2005 | |
| JP | 2008065817 A | | 3/2008 | |
| JP | 2009009484 | * | 1/2009 | ............. G06F 13/00 |
| JP | 2009009484 A | | 1/2009 | |

OTHER PUBLICATIONS

"Progress Image and Required functions of Communication Terminals in the IP-integration Age", Ministry of Internal Affairs and Communications (Japan), Workshop on Communication Terminals in the IP-integration Age (7th Meeting). Distributed Document 7-4, May 8, 2007, Internet <URL: http://www.soumu.go.jp/joho_tsusin/policyreports/chousa/ip_tsusin/pdf/070508_2_4.pdf>.

* cited by examiner

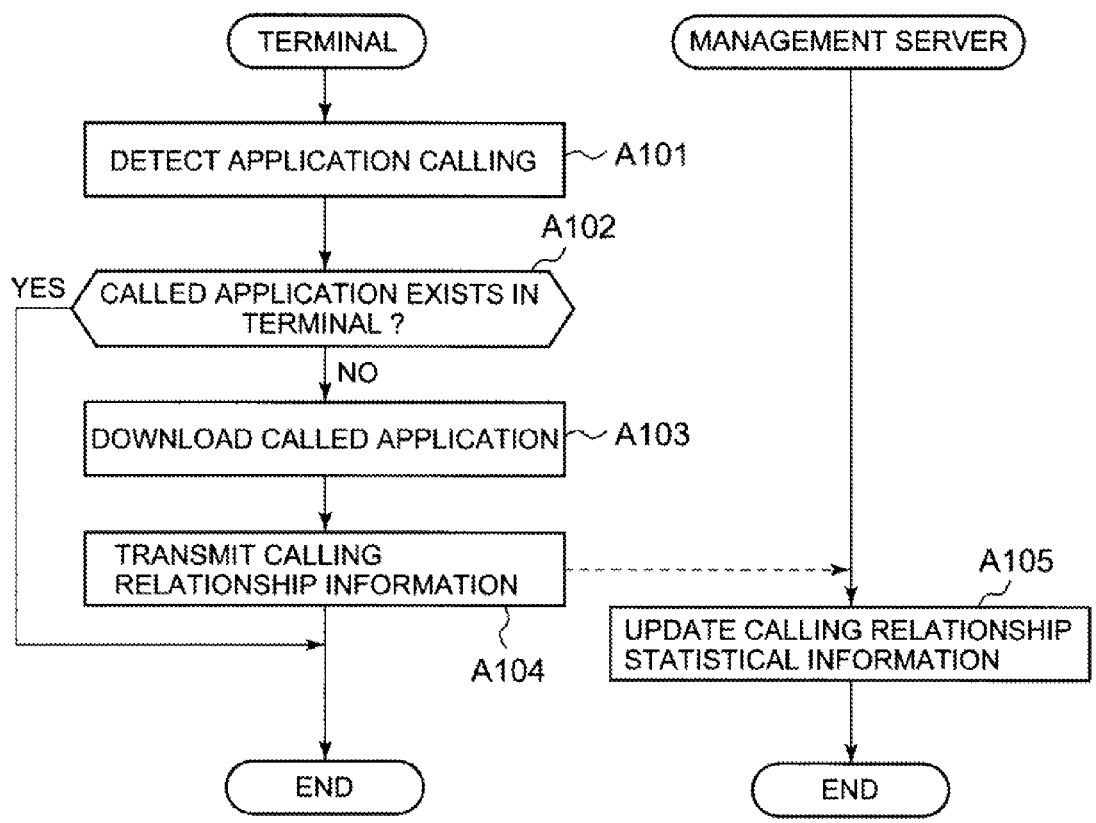

| CALLING APPLICATION | CALLED APPLICATION | THE NUMBER OF TIMES |
|---|---|---|
| APPLICATION A | APPLICATION B | 8 |
| | APPLICATION Z | 2 |

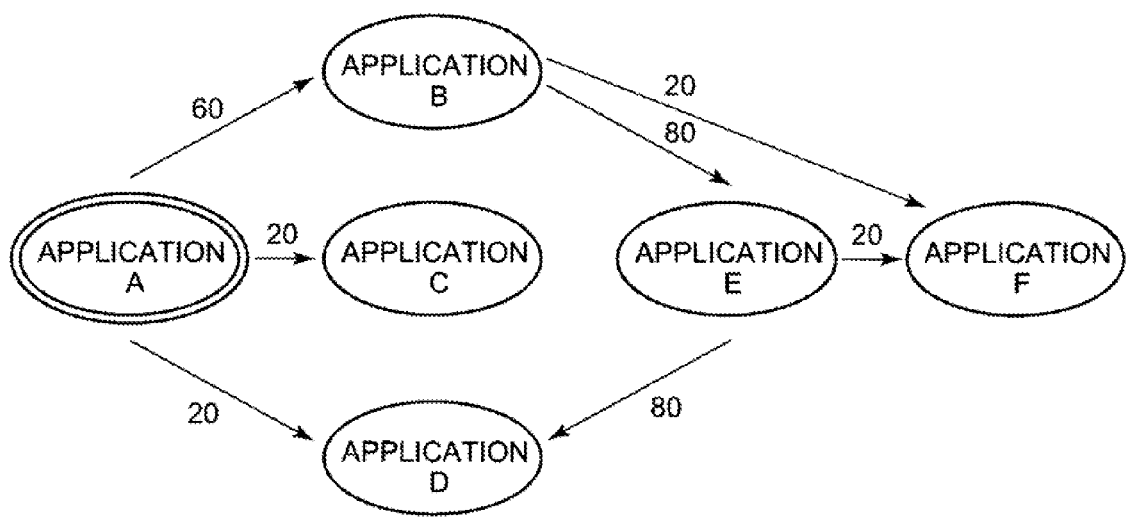

FIG. 13

| CALLING APPLICATION | CALLED APPLICATION | (CALLED APPLICATION) DOWNLOAD SOURCE URL |
|---|---|---|
| SCHEDULE APPLICATION | TRAIN TRANSFER GUIDE APPLICATION | http://foo.bar.com/norikaeApp |

FIG. 14

| CALLING APPLICATION | CALLED APPLICATION | (CALLED APPLICATION) DOWNLOAD SOURCE URL | THE NUMBER OF TIMES |
|---|---|---|---|
| SCHEDULE APPLICATION | TRAIN TRANSFER GUIDE APPLICATION | http://foo.bar.com/norikaeApp | 6 |
| | MAP APPLICATION | http://foo.com/mapApp | 6 |
| | WEATHER APPLICATION | http://hope.com/tenkiApp | 3 |
| APPLICATION A | APPLICATION B | http://sample/bApp | 1 |
| ⋮ | ⋮ | ⋮ | ⋮ |

FIG. 15

| CALLING APPLICATION | CALLED APPLICATION | (CALLED APPLICATION) DOWNLOAD SOURCE URL | THE NUMBER OF TIMES |
|---|---|---|---|
| SCHEDULE APPLICATION | TRAIN TRANSFER GUIDE APPLICATION | http://foo.bar.com/norikaeApp | 6 |
| | MAP APPLICATION | http://foo.com/mapApp | 6 |
| | WEATHER APPLICATION | http://hope.com/tenkiApp | 3 |

FIG. 16

```
APPLICATION NAME:
    SCHEDULE APPLICATION

RELATED APPLICATION:
    TRAIN TRANSFER GUIDE APPLICATION
    MAP APPLICATION

RELATED APPLICATION URL:
    http://foo.bar.com/norikaeApp
    http://foo.com/mapApp

```
DOWNLOAD ?

☐ TRAIN TRANSFER GUIDE APPLICATION
    size:500KB

☐ MAP APPLICATION
    size:1MB

[ OK ]

[ CANCEL ]
```

FIG. 18

```
GET /norikaeApp HTTP/1.1
Host:foo.bar.com
...
Via:CPServer_A
```

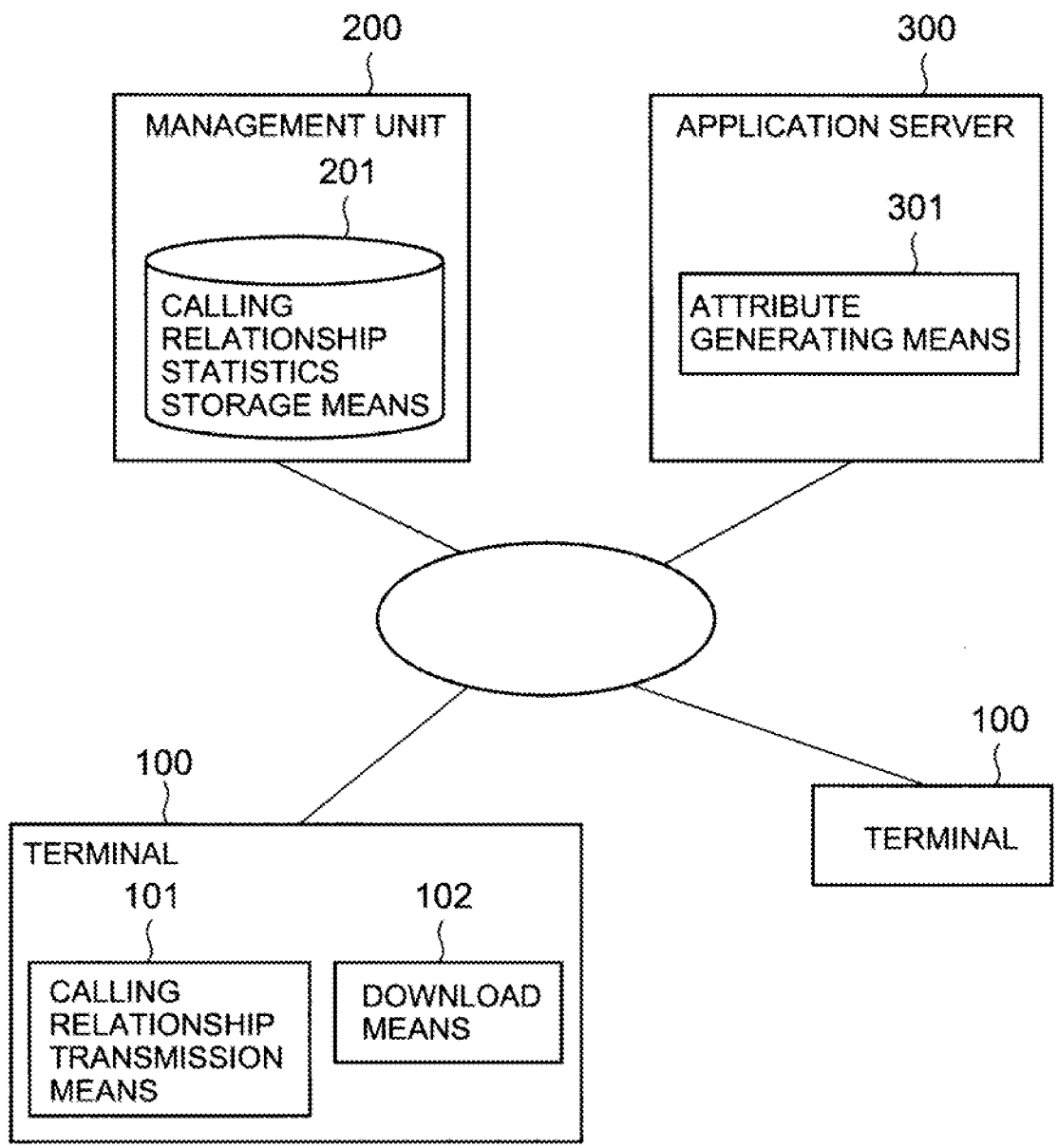

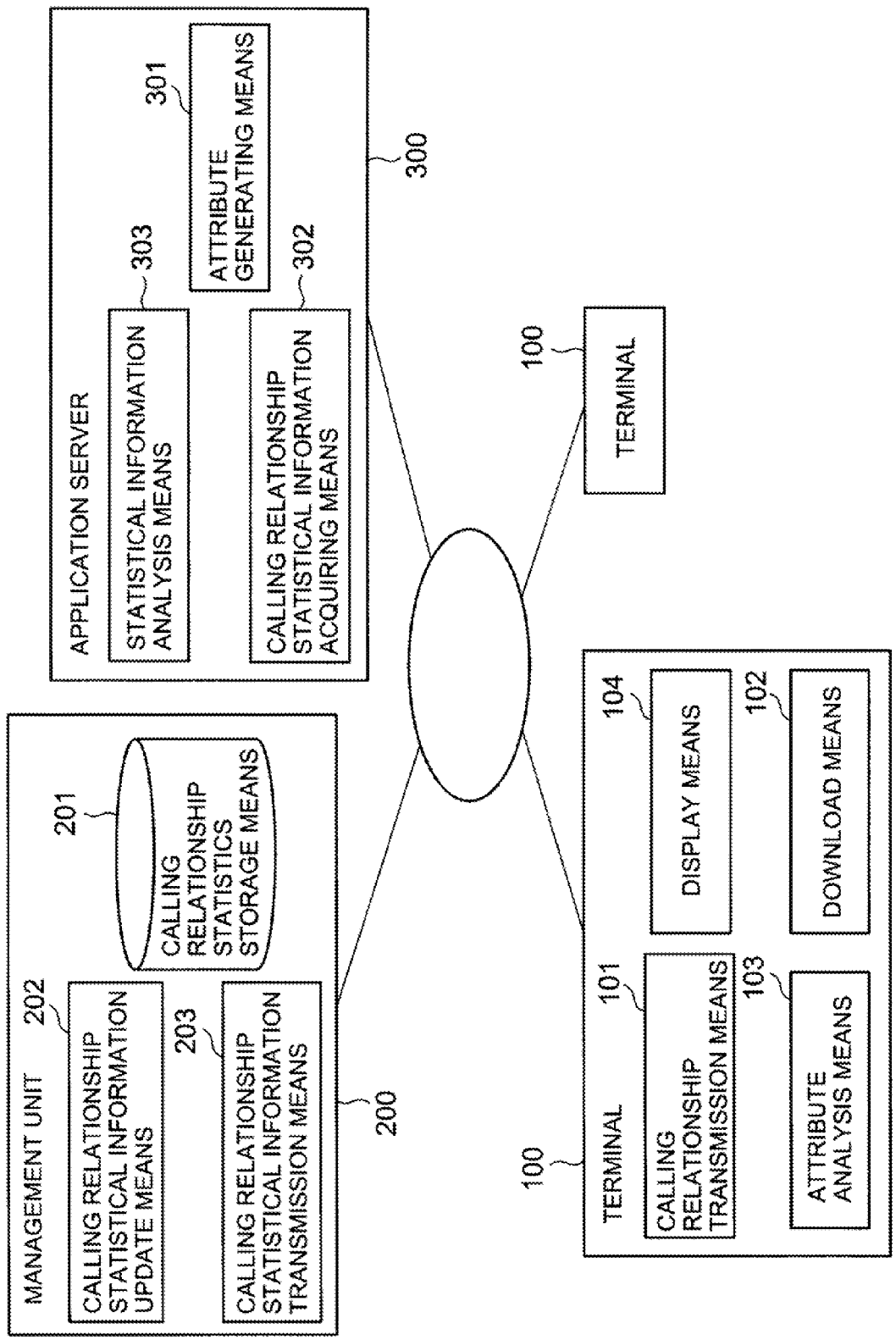

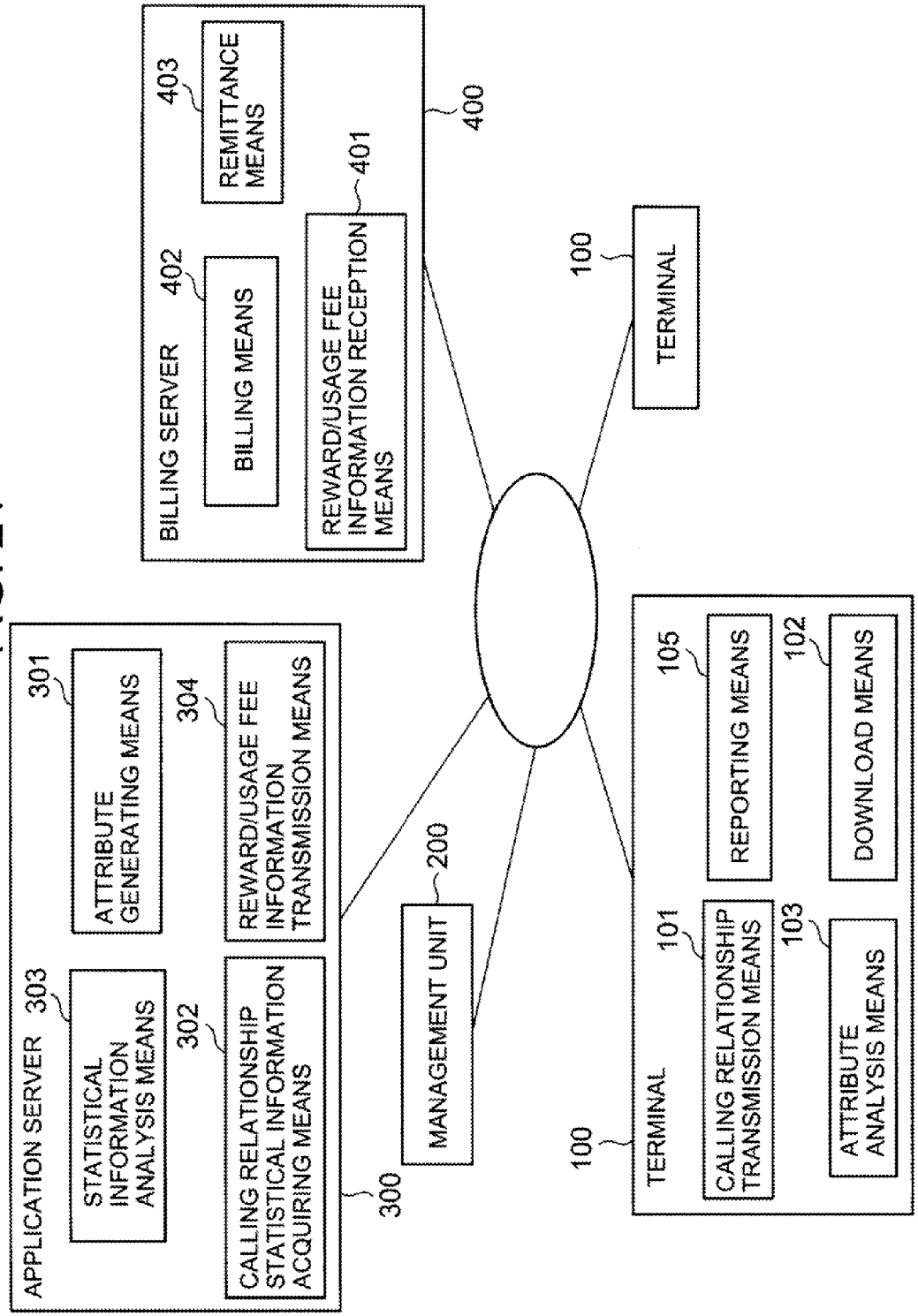

… # DOWNLOADING SYSTEM, AND UNIT, METHOD AND PROGRAM FOR THE SAME

TECHNICAL FIELD

The present invention relates to a download system, an information processing terminal, a management unit, an application server, a billing server, a download method and a download program to be employed for an environment in which a terminal downloads and executes an application or content data.

BACKGROUND ART

In recent years, mobile information communication terminals (cellular phones, smart phones, PDAs (Persona Digital Assistants), etc.) have increasing opportunities of downloading and installing applications via a wireless connection or via a personal computer (PC). Java® applications are an example of such applications. The user of a cellular phone can run a favorite Java application on the cellular phone by selecting and downloading the favorite Java application from a browser screen, etc.

As above, such mobile information communication terminals, capable of increasing functions by downloading applications, are expected to continue to increase in the future. Incidentally, the functionality expansion by downloading applications has been cited as an essential function also in "Workshop on Communication Terminals in the IP-integration Age" held by the Ministry of Internal Affairs and Communications (Japan), as described in Non-Patent Document 1.

Incidentally, the timing of downloading an application can be 1) upon selection by the user, 2) upon detection of a trigger, or 3) on demand. The first timing corresponds to a method downloading the application when a selection (to download the application) is made from the browser screen, etc. by the user operation. The second timing corresponds to a method downloading the application when a certain condition (regarding time, place, etc.) is satisfied. The third timing means, for example, the instant when an application calls up another application. In the present invention, when an application calls up another application and the calling causes execution of some kind of process, such an event or function is referred to as "application interoperability". The third timing corresponds to, so to say, a method downloading the called application (called up by the application interoperability) from a server on a network when the called application does not exist in the terminal. This method can be translated as on-demand application download by use of an application.

The present invention is targeted mainly at the on-demand application download. Problems with the on-demand application download may include a long download time which sometimes makes the user feel as if the currently executed process had stopped and impossibility of continuing the currently executed process (due to impossibility of download) when the network is unusable. Therefore, a method, capable of previously figuring out necessary applications (i.e., applications related to the currently executed application) and thereby completing the download of the necessary applications before such a necessary application is called up, is being requested.

In addition, since the resources of a mobile information communication terminal are generally more limited compared to PCs (Personal Computers), etc., downloading all the related applications can lead to exhaustion of the storage. Further, with the increase in the number of downloaded applications and the application size, fees charged to the user (content fee, packet fee, etc.) also increase correspondingly. Therefore, it is necessary to limit the download of applications to those that seem to be really necessary.

Techniques for extracting necessary or related applications have been disclosed in literatures such as Patent Document 1 and Patent Document 2, for example. In a technique disclosed in the Patent Document 1, when calling relationships among methods are listed, a method list whose number of times of calling is large is displayed at a position easily accessible to the user.

Meanwhile, in the Patent Document 2, a method for a thin-client terminal for prefetching (previously acquiring/transferring) an appropriate work environment (files, applications, etc.) to an appropriate application server has been described.

Further, a method for downloading related data by use of statistical data regarding the order relationship among called functions has been described in Patent Document 3.

CITATION LIST

Patent Literature

Patent Document 1: JP-2005-327036-A
Patent Document 2: JP-2004-094411-A
Patent Document 3: JP-HEI11-312203-A

Non-Patent Literature

Non-patent Literature 1: "Workshop on Communication Terminals in the IP-integration Age (7th Meeting) Distributed Document 7-4: Progress Image and Required functions of Communication Terminals in the IP-integration Age", [online], May 8, 2007, Ministry of Internal Affairs and Communications (Japan), [Date of Search: Nov. 12, 2008], Internet <URL: http://www.soumu.go.jp/joho_tsusin/policyreports/chousa/ip_tsu sin/pdf/070508_2_4.pdf>

SUMMARY OF INVENTION

Technical Problem

However, each of the above inventions is incapable of predicting necessary applications, data, etc. in advance, since judgment based on history records or statistical data is necessary.

In the Patent Document 1, statistical information is generated by monitoring the number of times of the method calling by executing programs, and thus it is impossible to figure out the tendency without repeating the program execution a certain number of times.

Also in the Patent Document 2, accumulating sufficient amount of information usable for prediction is necessary since the method of the Patent Document 2 predicts necessary data by figuring out patterns by use of information like access history records.

Also in the Patent Document 3, the described method is only capable of controlling the download based on anticipation at the stage at which sufficient statistics are not acquired. Further, the download method described in the Patent Document 3 is a method for downloading related data when a function is called up, and thus the method does not consider previously downloading the related data in contemplation of a possibility that the download can become impossible when necessary due to the communication status, etc. In other words, the method of the Patent Document 3 does not consider that previously figuring out related data, etc. is essential.

It is therefore the primary object of the present invention to provide a download system, an information processing terminal, a management unit, an application server, a billing server, a download method and a download program that make it possible to previously figure out and download applications having high probabilities of being used (called up).

Solution to Problem

A download system in accordance with the present invention comprises two or more terminals downloading and executing applications or content data, a management unit communicably connected to the terminals, and an application server managing applications or content data. The terminal includes: calling relationship transmission means which transmits calling relationship information, as information indicating calling relationship regarding an application or content data executed by the terminal, to the management unit; and download means which downloads an application or content data. The management unit includes calling relationship statistics storage means which stores calling relationship statistical information as information representing statistics of the calling relationship among applications or content data indicated by the calling relationship information received from the terminals. The application server includes attribute generating means which generates attribute data, including information representing applications or content data having high probabilities of being called up during the execution of an application or content data as related applications or related content data, for each application or content data managed by the application server based on the calling relationship statistical information stored in the calling relationship statistics storage means. The download means further downloads an application or content data based on the attribute data generated by the attribute generating means.

An information processing terminal in accordance with the present invention is an information processing terminal downloading and executing applications or content data, comprising: calling relationship transmission means which transmits calling relationship information indicating calling relationship regarding an application or content data to a prescribed management unit, communicably connected to two or more terminals including the information processing terminal and storing calling relationship statistical information as information indicating statistics of the calling relationship among applications or content data indicated by the calling relationship information received from the terminals, in response to download of an application or content data when the application or content data is called up; download means which downloads an application or content data from an application server managing the application or content data; and attribute analysis means which analyzes attribute-data attached to the downloaded application or content data and thereby extracts related applications or related content data from the attribute data in cases where the attribute data is attribute data attached by an application server that attaches information, indicating applications or content data having high probabilities of being called up during the execution of the application or content data as the related applications or related content data, as the attribute data based on the calling relationship statistical information stored in the calling relationship statistics storage means. The download means further downloads the related application or related content data extracted by the attribute analysis means.

A management unit in accordance with the present invention is a management unit communicably connected to two or more terminals downloading and executing applications or content data, comprising: calling relationship statistics storage means which stores calling relationship statistical information as information representing statistics of calling relationship among applications or content data indicated by calling relationship information received from the terminals; calling relationship statistical information update means which updates the calling relationship statistical information as the information representing the statistics of the calling relationship among applications or content data based on the calling relationship information received from the terminals; and calling relationship statistics transmission means which transmits at least part of the calling relationship statistical information stored in the calling relationship statistics storage means to an application server managing an application or content data based on a request from the application server.

An application server in accordance with the present invention is an application server managing applications or content data, comprising attribute generating means which generates attribute data, including information representing applications or content data having high probabilities of being called up during the execution of an application or content data as related applications or related content data, for each application or content data managed by the application server based on calling relationship statistical information which is stored in a prescribed management unit communicably connected to two or more terminals as information indicating statistics of calling relationship among applications or content data indicated by calling relationship information received from the terminals.

A billing server in accordance with the present invention is a billing server which executes a billing process related to application download, comprising: reward information reception means which receives reward information from a terminal that downloaded a related application or related content data based on information on the related application or related content data attached as attribute data of an application or content data or from an application server that acquired information indicating the fact from the terminal, the reward information indicating an application server managing the downloaded related application or related content data as a payer and an application server managing the application or content data, to which the information indicating the related application or related content data has been attached as the attribute data, as a payment recipient; billing means which executes the billing process to the application server as the payer based on the reward information; and remittance means which executes a remittance process to the application server as the payment recipient based on the reward information.

A download method in accordance with the present invention is a download method for allowing a terminal to download an application or content data. In the download method, two or more terminals transmit calling relationship information, as information indicating calling relationship regarding an application or content data executed by the terminal, to a management unit. The management unit updates calling relationship statistical information as information indicating statistics of the calling relationship among applications or content data based on the calling relationship information received from the terminals. An application server managing applications or content data generates attribute data, including information representing applications or content data having high probabilities of being called up during the execution of an application or content data as related applications or related content data, for each application or content data managed by the application server based on the calling relationship statistical information stored in the management unit. The terminal further downloads an application or content data based on the attribute data generated by the application server.

A download program in accordance with the present invention is a download program to be employed for an information processing terminal which downloads and executes applications or content data. The download program causes a computer to execute: a process of transmitting calling relationship information indicating calling relationship regarding an application or content data to a prescribed management unit, communicably connected to two or more terminals including the information processing terminal and storing calling relationship statistical information as information indicating statistics of the calling relationship among applications or content data indicated by the calling relationship information received from the terminals, in response to download of an application or content data when the application or content data is called up; a process of analyzing attribute data attached to an application or content data upon download of the application or content data from an application server managing applications or content data and thereby extracting related applications or related content data from the attribute data in cases where the attribute data is attribute data attached by an application server that attaches information, indicating applications or content data having high probabilities of being called up during the execution of the application or content data as the related applications or related content data, as the attribute data based on the calling relationship statistical information stored in the calling relationship statistics storage means; and a process of further downloading the extracted related application or related content data.

A download program in accordance with the present invention is a download program to be employed for a management unit which is communicably connected to two or more terminals downloading and executing applications or content data. The download program causes a computer, equipped with calling relationship statistics storage means which stores calling relationship statistical information as information representing statistics of calling relationship among applications or content data indicated by calling relationship information received from the terminals, to execute: a process of updating the calling relationship statistical information as the information representing the statistics of the calling relationship among applications or content data based on the calling relationship information received from the terminals; and a process of transmitting at least part of the calling relationship statistical information stored in the calling relationship statistics storage means to an application server managing an application or content data based on a request from the application server.

Advantageous Effects of the Invention

According to the present invention, information on the related applications is attached as the attribute data of each application that can become a caller (calling application) based on the calling relationship statistical information for sharing the calling relationship information generated by a plurality of terminals. This makes it possible to figure out necessary applications previously and with ease. Thus, it is possible to increase the probability that the called application has already been downloaded to the terminal executing the calling application. Consequently, the called applications can be called up at high speed without the need of executing the on-demand download. Further, the currently executed process can be continued even in an environment in which no network is usable.

BRIEF DESCRIPTION OF DRAWINGS

FIG. 2 It depicts a flow chart showing an example of the process flow of a database generating process.

FIG. 3 It depicts an explanatory drawing showing an example of calling relationship information.

FIG. 7 It depicts an explanatory drawing showing an example of calling relationship among applications.

FIG. 8 It depicts, an explanatory drawing showing an example of attribute data.

FIG. 13 It depicts an explanatory diagram showing an example of the calling relationship information in a specific example.

FIG. 14 It depicts an explanatory diagram showing an example of the calling relationship statistical information after update in the specific example.

FIG. 15 It depicts an explanatory drawing showing an example of the calling relationship statistical information which is transmitted from a telecommunications carrier server to a CP server in the specific example.

FIG. 16 It depicts an explanatory drawing showing an example of the attribute data generated in the specific example.

FIG. 17 It depicts an explanatory drawing showing an example of a related application download confirmation dialog in the specific example.

FIG. 18 It depicts an explanatory drawing showing, an example of the via-server information transmitted in the specific example.

FIG. 19 It depicts an explanatory drawing showing the general outline of the present invention.

FIG. 20 It depicts a block diagram showing another example of the configuration of the download system in accordance with the present invention.

FIG. 21 It depicts a block diagram showing another example of the configuration of the download system in accordance with the present invention.

DESCRIPTION OF EMBODIMENTS

First Exemplary Embodiment

Figure 1:
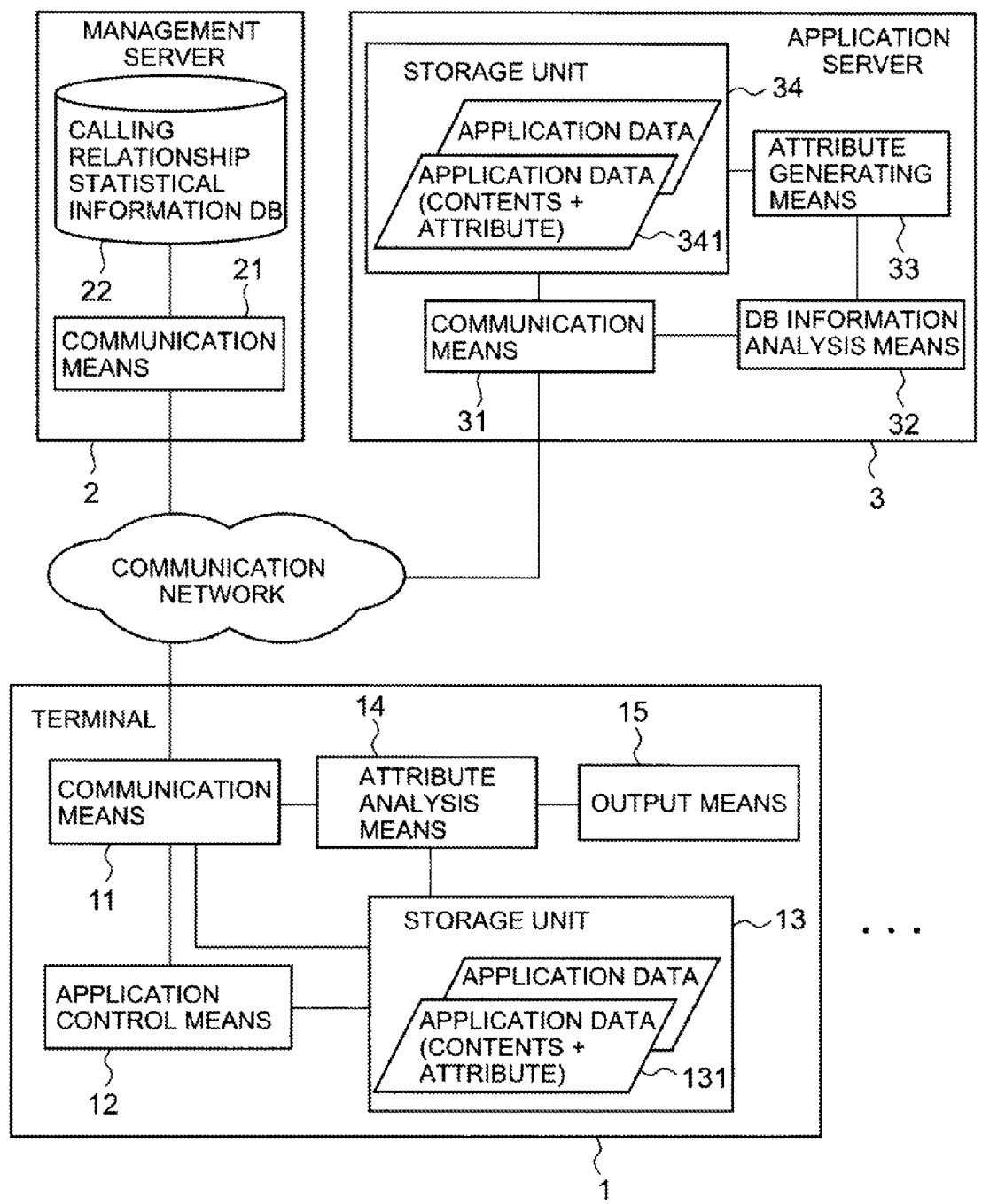
FIG. 1 It depicts a block diagram showing an example of the configuration of a download system in accordance with a first exemplary embodiment of the present invention.

Referring now to the drawings, a description will be given in detail of preferred exemplary embodiments in accordance with the present invention. FIG. 1 is a block diagram showing an example of the configuration of a download system in accordance with a first exemplary embodiment of the present invention. The download system shown in FIG. 1 comprises terminals 1, a management server 2 and an application server 3. While only one terminal 1 is shown in FIG. 1, the download system includes a plurality of terminals 1. Similarly, the download system may include a plurality of application servers 3 while only one application server 3 is shown in FIG. 1.

The terminal 1 includes communication means 11, application control means 12, a storage unit 13, attribute analysis means 14 and output means 15.

The communication means 11 is a means for communicating with the management server 2 and the application server 3 which will be explained later. Specifically, the communication means 11 transmits calling relationship information in the terminal 1 (i.e., the terminal 1 equipped with the communication means 11) to the management server 2. The communication means 11 has a function of downloading an application (concretely, application data 341) from the application server 3 and storing the downloaded application in the storage unit 13. Here, the application data 341 is information that includes the application (contents) and information indicating the attributes of the application (attribute data) managed by the application server 3.

The application control means 12 manages the life cycle (startup, ending, etc.) of each application stored in the storage unit 13. Further, when an application in execution calls up another application and an on-demand download occurs, the application control means 12 sends a transmission request, requesting the transmission of the calling relationship information on the on-demand download, to the communication means 11. The application control means 12 also sends an analysis request, requesting analysis of the attribute data attached to the acquired application, to the attribute analysis means 14.

The storage unit 13 stores applications (specifically, application data 131). The applications stored in the storage unit 13 include the applications downloaded from the application server 3. Incidentally, the application data 341 downloaded from the application server 3 may be directly stored in the storage unit 13 as the application data 131. In other words, an application to which the attribute data has been attached at the point of the download may be directly stored in the storage unit 13 in the same state (together with the attribute data attached thereto).

The attribute analysis means 14 analyzes the attribute data attached to a specified application and acquires information on related applications.

The output means 15 is a means for inquiring of the user about the download. For example, the output means 15 has a function of outputting a dialog to the display of the terminal 1.

In this exemplary embodiment, the communication means 11 is implemented by, for example, a CPU operating according to a program and a communication means of the terminal 1. The application control means 12 and the attribute analysis means 14 are implemented by, for example, a CPU operating according to a program. The storage unit 13 is implemented by a storage device. The output means 15 is implemented by, for example, a CPU operating according to a program and an output device (e.g., display) of the terminal 1.

The management server 2 includes communication means 21 and a calling relationship statistical information database (hereinafter referred to as a "calling relationship statistical information DB 22").

The communication means 21 receives the calling relationship information transmitted from the terminals 1 and thereby updates the calling relationship statistical information DB 22. The communication means 21 also transmits information stored in the calling relationship statistical information DB 22 (calling relationship statistical information) to the application server 3 according to a request from the application server 3.

The calling relationship statistical information DB 22 is a database system for storing the calling relationship statistical information on applications that has been acquired from the calling relationship statistical information received from the terminals.

In this exemplary embodiment, the communication means 21 is implemented by, for example, a CPU operating according to a program and a communication unit of the management server 2. The calling relationship statistical information DB 22 is implemented by, for example, a database system. The database system includes a storage device and a control device for organizing the information inputted to the storage device into a database and executing access control of the storage device.

The application server 3 includes communication means 31, DB information analysis means 32, attribute generating means 33 and a storage unit 34.

The communication means 31 receives a download request from a terminal 1 and delivers an application stored in the storage unit 34 together with its attribute data (i.e., delivers the application data 341). The communication means 31 also requests the management server 2 to supply the information stored in the calling relationship statistical information DB 22 (i.e., the calling relationship statistical information) related to an application managed by the application server 3.

The DB information analysis means 32 analyzes the information stored in the calling relationship statistical information DB 22 (calling relationship statistical information) acquired by the communication means 31 and extracts (information on) applications related to the application managed by the application server 3.

The attribute generating means 33 generates information representing the related applications as attribute data of the application based on the result of the analysis by the DB information analysis means 32, and attaches the generated information (attribute data) to the application data 341.

The storage unit 34 stores the applications managed by the application server 3. It should be noted that the storage unit 34 stores not only the main data of each application but also the attribute data of the application. In this exemplary embodiment, the application data 341, including the application (contents) and the information indicating the attributes of the application (attribute data), is stored and held in the storage unit 34.

In this exemplary embodiment, the communication means 31 is implemented by, for example, a CPU operating according to a program and a communication unit of the application server 3. The DB information analysis means 32 and the attribute generating means 33 are implemented by, for example, a CPU operating according to a program. The storage unit 34 is implemented by, for example, a database system. The database system includes a storage device and a control unit for organizing the information inputted to the storage device into a database and executing access control of the storage device.

Next, the operation of this exemplary embodiment will be described. The operation of the download system in this exemplary embodiment roughly includes three processes: 1) database generating process, 2) application attribute generating process and 3) application download process. These processes will be explained below referring to flow charts.

First, the database generating process will be explained referring to a flow chart of FIG. 2. FIG. 2 is a flow chart showing an example of the process flow of the database generating process in this exemplary embodiment. In the example of FIG. 2, it is assumed that an application in execution on the terminal 1 (application A) has called another application (application B). The application control means 12 detects the calling (step A101) and searches the storage unit 13 to check whether the called application (application B) has already been stored in the storage unit 13 (step A102). When the called application (application B) has already been stored in the storage unit 13 ("Yes" in the step A102), the called application is activated and the database generating process is ended without executing the subsequent steps.

In contrast, when the called application (application B) has not been stored in the storage unit 13 ("No" in the step A102), the application control means 12 sends a control request to the communication means 11 and thereby makes the communication means 11 download the application B from the application server 3 (step A103). The application control means 12 also executes a process of supplying the management server 2 with the calling relationship information indicating the calling relationship regarding the application that executed the download. In this case, the application control means 12 requests (transmission request) the communication means 11 to transmit transmission data, including the calling relationship information indicating that the application A called up the application B, to the management server 2. In this example, the transmission of the calling relationship information is carried out when a called application has been downloaded.

FIG. 3 is an explanatory drawing for explaining an example of the calling relationship information. As shown in FIG. 3, the calling relationship information can be, for example, information including identifiers (e.g., IDs) capable of identifying (specifying) the calling application and the called application. While the download source URL, etc. can be used as the application identifier, the application name is indicated as the application identifier in the example of FIG. 3 for easy understanding.

The communication means 11 transmits the transmission data, including the calling relationship information transferred thereto, to the management server 2 (step A104).

Figure 4:
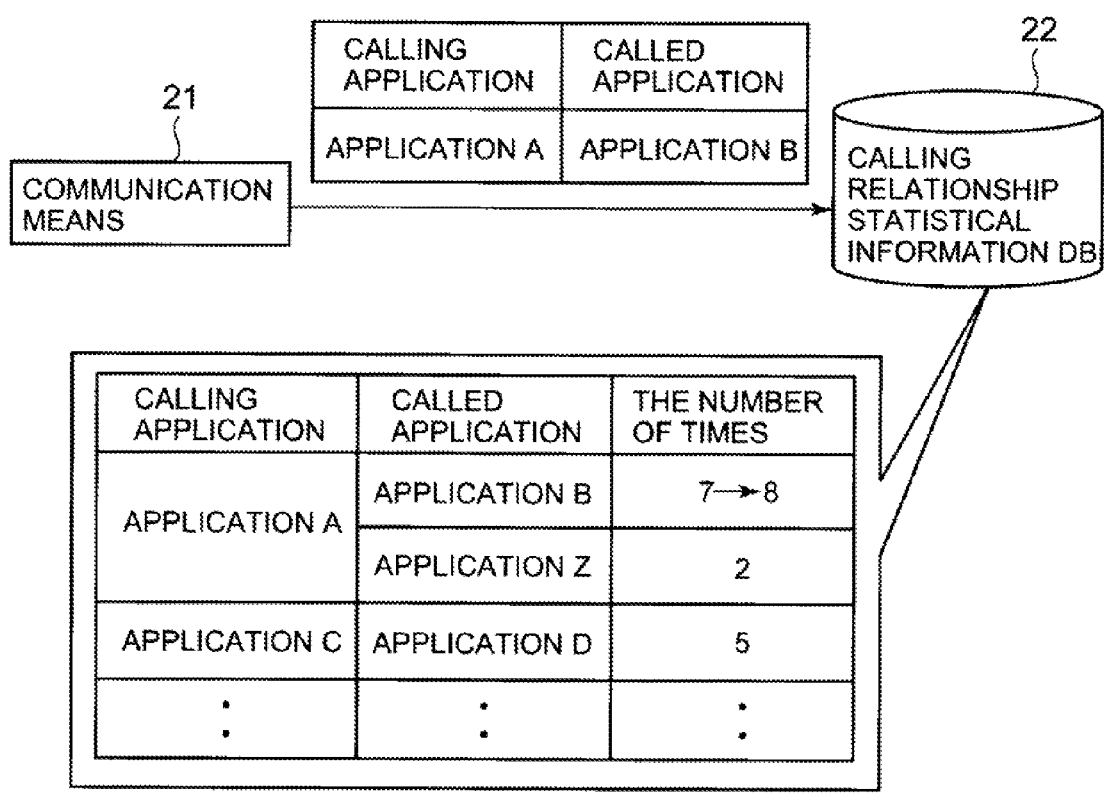
FIG. 4 It depicts is an explanatory drawing showing an example of calling relationship statistical information.

The communication means 21 in the management server 2 updates the calling relationship statistical information DB 22 based on the received calling relationship information (step A105). FIG. 4 is an explanatory drawing showing an example of the calling relationship statistical information stored in the calling relationship statistical information DB 22. As shown in FIG. 4, the calling relationship statistical information can be, for example, information including identifiers identifying (specifying) the calling application and the called application and data indicating the number of times of calling. In the step A105, the number of times of calling of the application B, included in the information in the calling relationship statistical information DB 22 regarding the application A, is incremented by 1, for example. Since the terminal 1 carries out the transmission of the calling relationship information in response to the download of the called application in this exemplary embodiment, "the number of times of calling" included in the calling relationship statistical information can also be translated as "the number of times of download caused by calling". In the following explanation, "the number of times of calling" represented by the calling relationship statistical information can also be expressed simply as "the number of downloads". In cases where the terminal 1 carries out the transmission of the calling relationship information in response to the calling of the called application, the process may be executed in the same way by regarding "the number of times of calling" directly as the number of times of calling.

The above is an example of the process flow of the database generating process in this exemplary embodiment. The information accumulated in the calling relationship statistical information DB 22 in the management server 2 includes not only the information supplied from the terminal 1 but also information supplied from a plurality of unshown terminals connectable to the management server 2. Therefore, statistical information used by a plurality of users, not information lopsided toward one user, is accumulated.

Figures 5, 6:
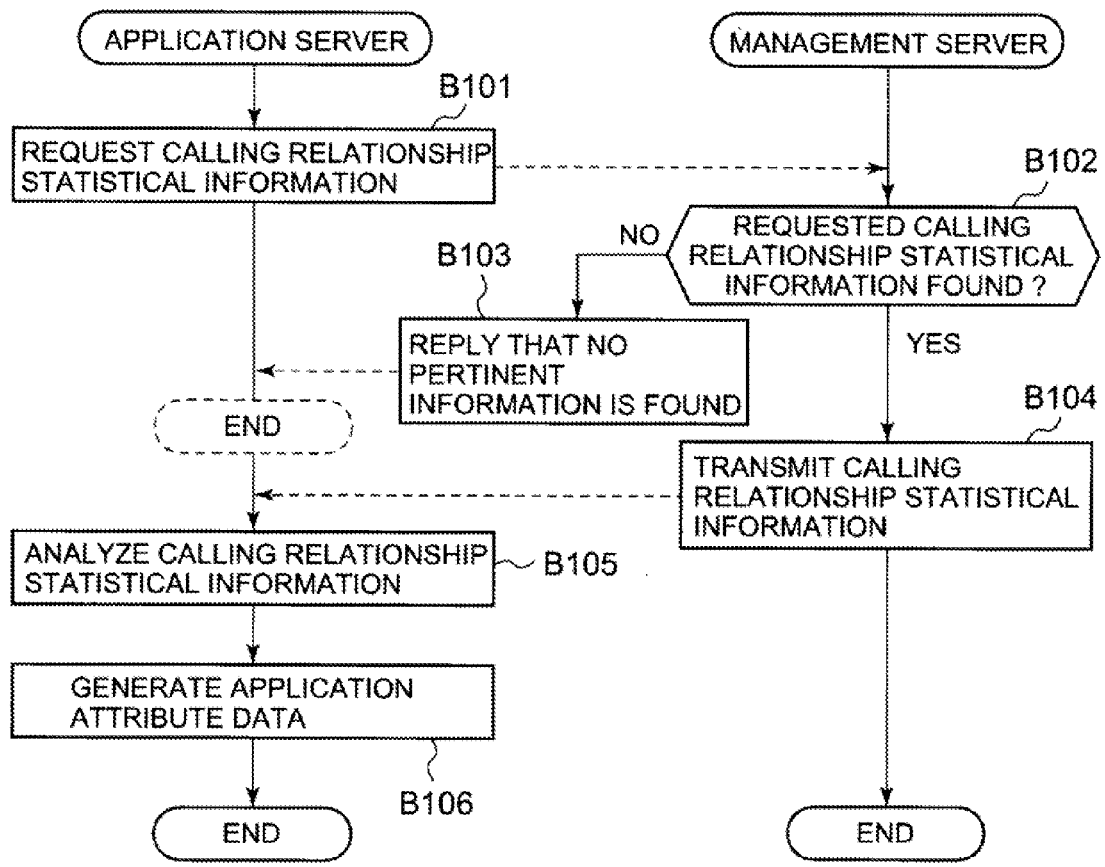
FIG. 5 It depicts a flow chart showing an example of the process flow of an application attribute generating process.
FIG. 6 It depicts an explanatory drawing showing an example of the calling relationship statistical information transmitted to an application server.

Next, the application attribute generating process will be explained referring to a flow chart of FIG. 5. FIG. 5 is a flow chart showing an example of the process flow of the application attribute generating process in this exemplary embodiment. It should be noted that the application server 3 described in this application attribute generating process is an application server managing the application A, which is not necessarily identical with the application server 3 described in the aforementioned database generating process (server storing the application B).

The communication means 31 of the application server 3 requests the management server 2 to supply the calling relationship statistical information on an application managed by the application server 3 (e.g., application A) with prescribed timing or in response to a request from the attribute generating means 33 (step B101). In this case, at least an application ID, indicating the application for which the calling relationship statistical information is requested (i.e., about which application the calling relationship statistical information is requested), is transmitted from the application server 3 to the management server 2. In this example, an application ID capable of specifying the application A is transmitted.

In the management server 2, the communication means 21 receives the request and searches the calling relationship statistical information DB 22 based on the application ID described in the request (step B102). When pertinent calling relationship statistical information is found ("Yes" in the step B102), the communication means 21 transmits the information to the requesting application server 3 (step B104). Here, the "pertinent calling relationship statistical information" means calling relationship statistical information related to the requested application (application specified by the request), such as calling relationship statistical information that includes information on the requested application as the first caller (first calling application).

An example of the calling relationship statistical information transmitted to the application server 3 is shown in FIG. 6. In the example of FIG. 6, the calling relationship statistical information indicates that the number of downloads of the application B caused by the calling of the application B by the application A is 8 in statistics, for example. The calling relationship statistical information also indicates that the number of downloads of the application Z caused by the calling of the application Z by the application A is 2 in statistics, for example. Incidentally, not only the calling relationship statistical information including the requested application A as the caller but also calling relationship statistical information acquired as the result of searches through some stages of calling relationships (e.g., calling relationship statistical information that includes an application called by the application A as the caller) may be included in the target of the transmission. In the step B104, the calling relationship statistical information including the application A as the caller may be transmitted as shown in FIG. 6, for example.

When no pertinent calling relationship statistical information is found ("No" in the step B102), the communication means 21 may transmit response data indicating the result (no pertinent calling relationship statistical information is found) to the application server 3 (step B103).

In the application server 3, the communication means 31 receives the calling relationship statistical information. The DB information analysis means 32 analyzes the calling relationship statistical information received by the communication means 31 and thereby extracts applications related to the application A (step B105).

The method of determining the applications to be extracted as the related applications is not particularly limited in the present invention. The related applications may be determined by a judgment regarding the number of applications (e.g., N applications from the top) or the number of downloads, for example. In this example, "the ratio of the number of downloads is 30% or more" is used as the condition for extracting an application as a related application. Referring to FIG. 6, the application B (the ratio of the number of downloads=8/10=80%) satisfies the condition, and thus the application B is extracted as a related application. When the response data indicating that no pertinent calling relationship statistical information is found is received, the process is ended without executing the subsequent steps.

The process of analyzing the calling relationship statistical information will be explained below in more detail. There is a possibility that the calling relationship statistical information is not in such a simple tree structure as in the above example. For example, the application A can call the application B, or an application D. Further, when the application A has called the application B. the application B can further call an application E, or an application F. Furthermore, when the application B has called the application E. the application E can further call the application F, or the application D. Considering these possibilities, the calling relationship statistical information can have a structure like the one shown in FIG. 7. FIG. 7 is an explanatory drawing showing an example of the calling relationship among applications.

Each arrow in FIG. 7 indicates the direction of the calling in the downloading application interoperability (relationship between a calling application and a called application when a download is executed). A numerical value on each arrow indicates the ratio of the number of downloads. In the analysis process regarding such a calling relationship structure, the calculation method shown at the bottom of FIG. 7 may be executed and the result of the calculation may be used for the judgment.

In the example of FIG. 7, it is indicated that the ratio of the number of downloads of the application B when the application A is the starting point is 0.6, for example. Further, it is indicated that the ratio of the number of downloads of the application C when the application A is the starting point is 0.2, for example. It is also indicated, for example, that the ratio of the number of downloads of the application D when the application A is the starting point is 0.584, as the sum of the ratio 0.2 of the number of downloads of the application D called by the application A and the ratio 0.384 of the number of downloads of the application D along the path: application A→application B→application E→application D.

By applying the aforementioned condition "the ratio of the number of downloads is 30% or more" to this case, the applications B, D and E are judged as the related applications of the application A.

Subsequently, the application attribute, means 33 generates the attribute data of the application A based on the information on the related applications extracted as the result of the analysis process by the DB information analysis means 32 (step B106). FIG. 8 is an explanatory drawing showing an example of the attribute data generated by the application attribute means 33. In the example of FIG. 8, two items representing the related application are attached as the attributes, namely, the name and the download source URL of the related application. Incidentally, it is sufficient if at least a piece of information capable of identifying (specifying) the related application is included in the item(s) representing the related application.

The above is an example of the process flow of the application attribute generating process in this exemplary embodiment. In regard to each application managed by the application server 3 itself, information representing the related applications are provided previously as the attribute data based on the calling relationship statistical information. This allows each terminal to acquire information on the related applications with ease.

The acquisition (update) of the calling relationship statistical information, which determines the timing of generating the attribute data, may be made at fixed periods, for example. The application server 3 may also request the management server 2 to supply the calling relationship statistical information when the download request for an application is received.

Figure 9:
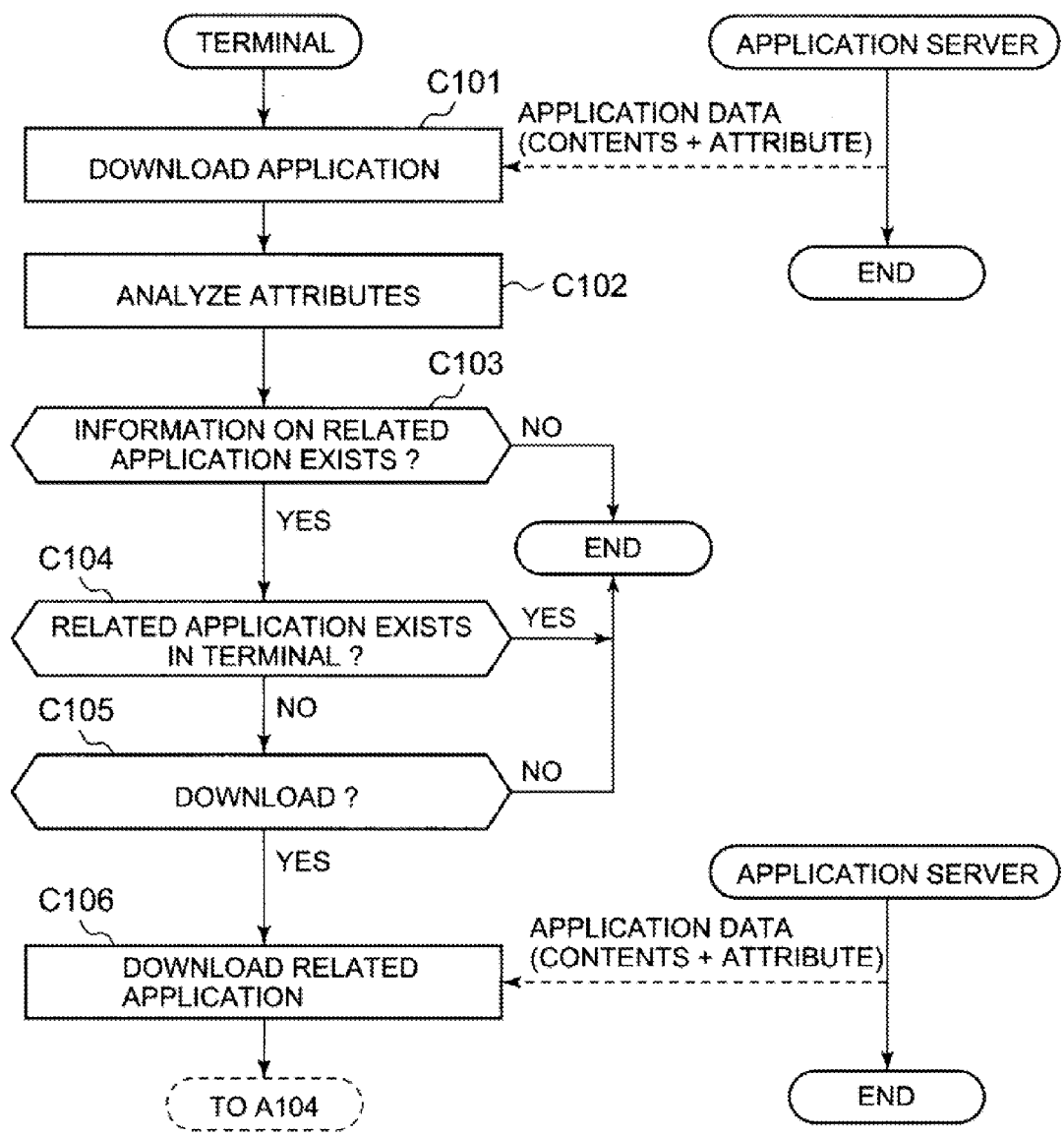
FIG. 9 It depicts a flow chart showing an example of the process flow of an application download process.

Next, the application download process will be explained referring to a flow chart of FIG. 9. FIG. 9 is a flow chart showing an example of the process flow of the application download process in this exemplary embodiment. It should be noted that the terminal 1 described in this download process can be any one of the terminals operated by the users of the download service provided by the download system, which is not necessarily identical with the terminal 1 described in the aforementioned database generating process. The terminal is simply expressed as "the terminal 1" in the explanation.

It is assumed, for example, that the application control means 12 has made the communication means 11 download the application A from the application server 3 according to a selection of the application A (from an unshown browser screen, etc.) by the user of the terminal 1 (step C101). In this case, the communication means 11 receives the main data of the application A and its attribute data (i.e., the application data 341) as the data of the download target application (application A in this example). The application data 341 received in this step is stored in the storage unit 13 as the application data 131.

Subsequently, the attribute analysis means 14 analyzes the attribute data of the application downloaded by the communication means 11 (step C102). The attribute analysis means 14 first checks whether or not information representing a related application exists as the attribute data (step C103). When no information representing a related application has been attached ("No" in the step C103), the download process is ended without executing the subsequent steps.

In contrast, when information representing a related application has been attached ("Yes" in the step C103), steps regarding the related application are executed. In this example, it is assumed that the information shown in FIG. 8, representing the application B as a related application, has been attached as the attribute data. Incidentally, the attribute data may be attached to the application by use of ADF (Application Descriptor File), for example. Besides ADF, data of any format capable of indicating the attributes can be used as the attribute data, such as a binary file, a text file and a structured file (e.g., XML (Extensible Markup Language) file).

As a step regarding the related application, the attribute analysis means 14 (or the application control means 12)

checks whether the related application represented by the attribute data exists in the terminal 1 or not (step C104). When the related application (i.e., application B) exists in the terminal 1 ("Yes" in the step C104), the download process is ended without executing the subsequent steps. In contrast, when the related application (application B) does not exist in the terminal 1 ("No" in the step C104), the process shifts to a download process for downloading the application B as the related application (step C105). Incidentally, it is also possible to restrict the process executed by the attribute analysis means 14 to the extraction of the information on the related applications and make the attribute analysis means 14 inform the application control means 12 of the result of the extraction. In such cases, the process from the step C104 is executed by the application control means 12.

When the process shifts to the download process for downloading the application B as the related application, the attribute analysis means 14 (or the application control means 12) may inquire of the user of the terminal 1 whether or not to download the application B as the related application (step C105). This inquiry step (confirmation step) is executed by the output means 15 by, for example, displaying a dialog, etc. on the unshown display. The displayed information is desired to include not only a name representing the application B but also the size and the price of the application. When the user determines not to download the application B (related application), the application download process is ended without downloading the related application.

When the user chooses to download the application B in the download inquiry step C105, the application control means 12 makes the communication means 11 access the application server 3 managing the application B (related application) and download the application B (step C106). The location (address) of the application server 3 as the download source (downloading site) may be determined by referring to the download source URL of the application B which has been attached as the attribute data of the application A.

In response to the completion of the download of the related application in the step C106, the application control means 12 executes a process for updating the calling relationship statistical information DB of the management server 2 (i.e., advances to the step S104 in FIG. 2). Specifically, the calling relationship information is transmitted from the terminal 1 to the management server 2. The management server 2 increments the number of downloads of the application B (as an application related to the application A) in the calling relationship statistical information DB by 1.

The above is an example of the process flow of the application download process in this exemplary embodiment. Incidentally, it is also possible to further analyze attribute data attached to the application B (related application which has been downloaded) and attempt to similarly download an application related to the application B when such a related application exists. The attribute data analyzing process (step) may also be executed with timing other than the completion of the download of an application, such as upon the first activation of the downloaded application.

There are cases where the download of the application determined as the download target application is impossible due to the communication status, etc. In such cases, information on the application to be downloaded may be held in a queue and the download of the application may be executed upon recovery of the communication status based on the information held in the queue.

As described above, according to this exemplary embodiment, a database (e.g., the calling relationship statistical information DB 22) is constructed and shared by gathering the calling relationship information on applications from a plurality of terminals connectable to the management server 2. Based on the information (database), the application server 3 provides information on the related applications as the attribute data. Therefore, even for an application that is downloaded by a terminal for the first time, the terminal is allowed to learn about applications related to the downloaded application previously (before such a related application is called up) and with ease. Since the terminal is capable of previously downloading applications having high probabilities of being called up, applications can be called up at higher speed compared to the method downloading each application after the application is actually called. Further, even when the network is unusable when an application is called, the process in execution can be continued (within the extent of previously downloaded applications) since the probability that related applications have previously been downloaded is high.

Further, the application server 3 can grasp how the applications managed by itself are used by the terminal users by referring to the database of the management server 2. The information acquired from the database can be used for reference in the upgrading of an application to a new version. The information can also be used for reducing the development cost by, for example, removing an interface of a function that is not used (application that has called no application or that has not been called).

Furthermore, the functions necessary on the terminal's side can be reduced since each terminal 1 does not have to execute the process of analyzing the database of the management server 2. Even though the attribute data analyzing process is necessary, the implementation can be facilitated further by use of the ADF already employed in a great number of cellular phones for Java application download service, etc.

In this exemplary embodiment, the terminal 1 carries out the transmission of the calling relationship information in response to the download of a called application for the following reason: Since the present invention is configured to let a plurality of terminals share statistical information, it is necessary to eliminate the possibility of generating statistical information advantageous to a particular user due to a malicious terminal user's repeated execution of calling advantageous to himself/herself. Incidentally, in cases where the extraction of the related applications is desired to be executed not based on the number of downloads but based purely on the number of times of calling, the terminal 1 may also be configured to transmit the calling relationship information upon each calling. In such cases, it is desirable to take appropriate countermeasures, such as restricting the number of pieces of calling relationship information received from one terminal in regard to one application, rejecting subsequent reception of calling relationship information when calling relationship information having the same contents is received from one terminal frequently (e.g., multiple times within a prescribed period), etc.

Second Exemplary Embodiment

Figure 10:
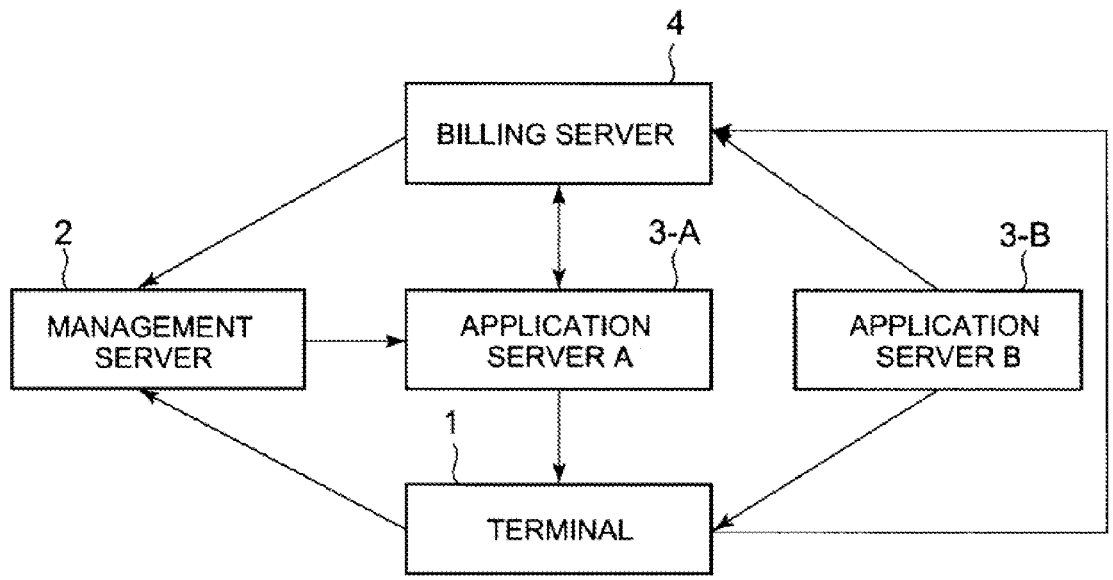
FIG. 10 It depicts a block diagram showing an example of the configuration of a download system in accordance with a second exemplary embodiment of the present invention.

Next, a second exemplary embodiment in accordance with the present invention will be described. FIG. 10 is a block diagram showing an example of the configuration of a download system in accordance with this exemplary embodiment. As shown in FIG. 10, the download system in this exemplary embodiment is newly provided with a billing server 4. In FIG. 10, the application server 3-A represents an application server managing the application A, and the application server 3-B represents an application server managing the application B.

This example provides a mechanism for making the application server 3-B pay a reward to the application server 3-A as a consideration for the download of one application (application B in this example) by a terminal 1 carried out based on the attributes of another application (application A in this example) describing the application B as a related application. The billing server 4 is a server functioning as the mediator of the payment.

Figure 11:
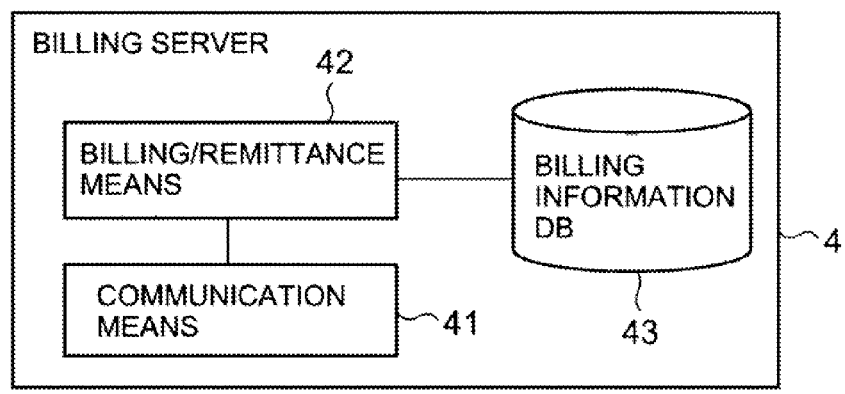
FIG. 11 It depicts a block diagram showing an example of the configuration of a billing server 4.

FIG. 11 is a block diagram showing an example of the configuration of the billing server 4. In the example of FIG. 11, the billing server 4 includes communication means 41, billing/remittance means 42 and a billing information database (DB) 43.

The communication means 41 receives reward information from the application server 3 managing the downloaded related application (application server 3-B in this example). The reward information indicates that the application server (payer) pays a prescribed reward to an application server that is specified as the payment recipient in the reward information.

Based on the reward information received by the communication means 41, the billing/remittance means 42 bills the application server as the payer (i.e., the application server 3-B) and remits the reward to the application server as the payment recipient (i.e., the application server 3-A).

Figure 12:
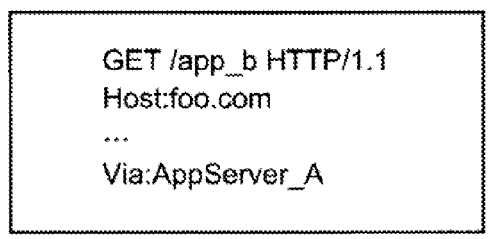
FIG. 12 It depicts an explanatory drawing showing an example of via-server information.

For the transmission of the reward information to the billing server 4, the communication means 31 of the application server managing the application downloaded as a related application needs to learn based on information from which application server the related application was downloaded. In order to implement such a function in this exemplary embodiment, when a terminal 1 downloads a related application (e.g., the step C106 in FIG. 9), the terminal 1 provides (attaches) via-server information which indicates information from which application server was used for the download of the related application. FIG. 12 shows an example of the via-server information. In the example of FIG. 12, via-server information, as information capable of identifying (specifying) the application server A as a via-server, is attached by use of the HTTP request header by describing "Via:AppServer_A" in the request header. This allows the application server 3-B to recognize that the application managed by the application server 3-B itself has been downloaded due to a calling from an application managed by the application server 3-A. Incidentally, it is also possible to attach via-application information, indicating to which application the downloaded related application was related, instead of the via-server information and use the via-application information for identifying (determining) the application server managing the application.

Besides methods like that shown in FIG. 12 employing the GET method of HTTP, methods employing the POST method are also possible. Even when the POST method is employed, the informer server information or the via-application information may be sent in the same format as in the case where the GET method is employed. While an example in which the terminal 1 sends the informer server information or the via-application information together with the download request is shown in this exemplary embodiment, the timing of sending the information is not restricted to this example. For example, the terminal 1 may also send the informer server information or the via-application information after downloading the related application.

Besides using the HTTP request, the information can also be sent using an interface specifically defined between the terminal 1 and the application server 3, or using an email, for example.

The reward information transmitted from the application server 3 to the billing server 4 is desired to include information specifying the payer (e.g., ID of the application server 3-B), information specifying the payment recipient (e.g., ID of the application server 3-A) and price information on the reward.

The billing and the remittance of the reward by the billing/remittance means 42 may be carried out based on account information or credit information on each application server 3 previously registered in the billing information DB 43 of the billing server 4, for example. The registration of the credit information, etc. may be conducted through a Web system, for example.

Meanwhile, it is also possible to request the application server 3-A to pay for the use of the calling relationship statistical information on the application A. In the billing server 4, the communication means 41 may receive usage area information from the application server 3-A, and the billing/remittance means 42 may bill the application server 3-A based on the usage fee information and remit the usage fee to the management server 2, for example.

The usage fee information may include information specifying the payer (e.g., ID of the application server 3-A), for example. The usage fee information may further include information specifying the payment recipient (e.g., ID of the management server 2) and price information on the usage fee.

The billing and the remittance of the usage fee by the billing/remittance means 42 may be carried out based on previously registered credit information, etc. similarly to the aforementioned mechanism for the reward.

While methods for calculating the reward and the usage fee are not particularly stipulated in the present invention, it is possible, for example, to set the reward at 10% of the price of the application and set the usage fee at "x cents" for each reference of the calling relationship statistical information. The calculation methods may be determined appropriately for the operation of the system of the present invention.

The billing information DB 43 stores information necessary for the payment of the reward from an application server to an application server and information necessary for the payment of the usage fee from an application server to the management server. For example, the billing information DB 43 may store the account information and the credit information on each application server 3 and the account information on the management server.

As described above, according to this exemplary embodiment, when an application (in execution on a terminal) managed by the application server 3-A (application A) calls another application (application B) and this causes the terminal to download the called application (application B), the application server 3-A presenting (providing information on) the related application is allowed to obtain an income (reward) from the application server 3-B delivering the application B. However, too frequent calling of other applications can be disliked and avoided by the terminal users and that can reduce the chance of calling other applications and obtaining rewards. Thus, it is necessary to figure out an appropriate calling mechanism within the extent not avoided by the terminal users.

Further, for the application server 3-B managing the application downloaded as the related application, information on the application managed by itself (application B) is described in the attributes of the calling application (application A). This increases the chance of the download of the application B and allows the application server 3-B to obtain sales income. However, since the reward has to be paid to the application server 3-A, a method for obtaining an income exceeding the reward has to be planned out. While the method can include obtaining advertising revenue by use of applications managed by the application server 3-B itself, obtaining reward income by further calling up other applications (e.g., application C), etc., the method is not particularly prescribed in the present invention.

Furthermore, the management server 2 can obtain the usage fee for the use of the calling relationship statistical information DB 22 from the application server 3-A.

Incidentally, while the application server 3 sends the reward information to the billing server 4 based on the informer server information or the via-application information sent from a terminal 1 in the above example, the reward information can also be sent from the terminal 1 directly to the billing server 4. For example, the terminal 1 may transmit the reward information to the billing server 4 after completing the download. In the reward information, the application server 3-B managing the related application may be specified as the payer and the application server 3-A managing the application that presented the related application may be specified as the payment recipient. The transmission of the reward information may be left out when the payer and the payment recipient are the same application server 3.

While the management server 2 and the application server(s) 3 were supposed to be different servers in the first and second exemplary embodiments, it is also possible to implement the management server 2 and an application server 3 by the same server.

While the download system in the second exemplary embodiment was newly provided with the billing server 4, the second exemplary embodiment does not necessarily need a new server, that is, the management server 2 and the billing server 4 may be implemented by the same server. In this case, the reward flows from the application server 3-B to the management server and to the application server 3-A, and the usage fee for the use of the calling relationship statistical information flows from the application server 3-A to the management server.

While the range of sharing the calling relationship statistical information DB 22 was not particularly specified in the first and second exemplary embodiments, the calling relationship statistical information DB 22 can be shared within one telecommunications carrier, within one company, or within friends, for example. Since the patterns of use of applications become more restrictive, the narrowing down of the range of the sharing depending on the purpose of use can improve the accuracy of the information stored in the calling relationship statistical information DB.

While only one calling relationship statistical information DB 22 was illustrated in the first and second exemplary embodiments, the download system can include a plurality of calling relationship statistical information DBs 22. Specifically, a plurality of databases may be generated corresponding to the ages, genders, etc. of the users of the terminals 1. In this case, the terminal 1 transmitting the calling relationship information may further transmit user information on the terminal 1, for example, so that the management server 2 can determine into which database the information should be incorporated. It is also possible, for example, to make the terminal 1 transmit its SIM (Subscriber Identity Module) information and make the management server 2 acquire subscriber information from a telecommunications carrier, etc. based on the SIM information. The communication means 21 of the management server 2 determines a calling relationship statistical information DB 22 to be updated (target of update) based on the acquired information (gender, etc.) and updates the determined DB 22. The transmission of the user information can also be implemented by displaying a dialog, etc. and thereby prompting the user of the terminal 1 to declare his/her age, gender, etc. for himself/herself. With these examples, improvement of the accuracy of the information stored in each calling relationship statistical information DB 22 can be expected since statistical information within a more limited range (regarding the ages, genders, etc. of users of the terminals 1) is used.

While the terminal 1 in the first exemplary embodiment before downloading the related application (application B) together with the calling application (application A) inquires of its user whether or not to download the related application (application B), the presence/absence and the timing of the inquiry are not restricted to this example. For example, it is also possible to let the user make a setting regarding the permission/prohibition of automatic download of related applications through a setting screen, etc. instead of inquiring of the user each time.

While the information stored in the calling relationship statistical information DB 22 managed by the management server 2 (calling relationship statistical information) included information on the calling application, the called application and the number of times of calling (more specifically, the number of downloads caused by calling) in the first and second exemplary embodiments, the contents of the calling relationship statistical information are not restricted to this example. For example, the calling relationship statistical information may further include information on the sizes of the applications, the URL of the download source server, etc.

The timing of the download of the related application may be different from that of the download of the application calling the related application. For example, a process for downloading a related application (related to a certain application) may be started when the certain application is activated. The download of the related application may also be executed when the processing load on the terminal 1 is low or there are sufficient free network resources after the download or activation of the certain application. In this case, the terminal 1 may be equipped with a means for monitoring the terminal's processing status and the network status and may be configured to check the presence/absence of an application waiting for the download in response to a notification from the monitoring means.

While the targets of the download were applications in the first and second exemplary embodiments, the download targets are not restricted to applications. In other words, the download systems according to the exemplary embodiments are usable also for downloading data (image data, sound data, etc.), HTML files, other types of documents, etc. For example, a process of previously downloading image data having high probabilities of being used by an application is possible in the download system.

The application downloaded in the download system in accordance with the present invention may be of any type as long as the application has an execution entity (program or a machine language instruction or intermediate language instruction compiled from the program). Specifically, the application can be a Java application, a device-specific native application, an application created in a script language or the like, a simple application like Widget, etc.

While the related applications as the download targets are extracted under the condition "the ratio of the number of downloads is 30% or more" in the first exemplary embodiment, the condition for the extraction of the download targets is not restricted to this example. Specifically, the judgment on the download targets may be made by taking the size of each application (download target), the present network status, etc.

into consideration. Information on the network status may be acquired by monitoring means of the application server 3, for example. It is also possible to previously attach a relatively large amount of information on applications that can become candidates for the related applications to each application as the attribute data and allow the terminal 1 to select the download targets based on the size of each download target, the load on the terminal, the present network status, etc. In such cases, the status inside the terminal 1, the network status, etc. may be monitored by the monitoring means of the terminal 1.

While the calling relationship statistical information is always accumulated in the calling relationship statistical information DB 22 in the first and second exemplary embodiments, the calling relationship statistical information may be managed differently. For example, control for resetting the calling relationship statistical information at prescribed periods may be provided. This makes it possible to determine the applications to be downloaded (download targets) based on the tendency in a limited period (from the reset of the database to the present time).

While the request for the calling relationship statistical information is made according to timing determined by the application server 3 in the first exemplary embodiment, the request may be made differently. Since the calling relationship statistical information changes from moment to moment, it is possible to provide a mechanism for making the application server 3 request the calling relationship statistical information (in order to update the calling relationship statistical information to new information) at prescribed periods or under a prescribed condition. For example, the management server 2 may be provided with monitoring means for monitoring the calling relationship statistical information DB 22 and the monitoring means may send a request for the update to the application server 3 via the communication means 21 when the monitoring means judges that the update should be made (e.g., when calling ratio of an application has changed). In the application server 3, the application attribute generating process may be executed when the update request is received.

In the first and second exemplary embodiments, each application's attributes generated by the application server 3 were assumed to be always credible. However, there is a possibility that a malicious application server intentionally generates the application attributes in a biased manner. Specifically, such a malicious application server can describe information on an application that is not actually used (assumed here to be the application Z) in the attributes of an application and thereby obtain the reward from an application server 3-Z delivering the application Z. This problem can be resolved by a method authenticating the application server itself, a method checking whether the information described in the attributes is correct or not, etc. The former method can be implemented by, for example, a mechanism for proving the application server to be a server authorized by the management server 2 by use of a certificate from the management server 2. The latter method needs a mechanism for referring to the management server 2 to confirm the contents (description) of the attributes, for example.

For example, when there exists information representing a related application in the step C103 in FIG. 9, the terminal 1 may transmit the received attribute data to the management server 2 in order to inquire of the management server 2 whether the information is correct or not. The management server 2 may be provided with attribute verification means for verifying the attribute data, for example. The attribute verification means may compare the information on related applications indicated by the attribute data transmitted from the terminal 1 with information on related applications indicated by the calling relationship statistical information DB 22 managed by the management server 2 itself, verify whether the description of the attribute data has no problem, and send back the result of the verification. As in this example, the aforementioned problem can be resolved by providing the management server 2 with a means for verifying the attribute data.

Next, the operations of the first and second exemplary embodiments of the present invention will be explained in detail by taking a specific example. The explanation of this example will be given by taking the application interoperability function in a cellular phone as an example. In this example, the terminals 1 are cellular phones. The management server 2 is a server of a telecommunications carrier (telecommunications carrier server). The application server 3 is a server of a content provider (CP server). In the following, the database generating process, the application attribute generating process and the application download process will be explained together with a billing/remittance process accompanying these processes.

First, the database generating process will be explained. It is assumed that a schedule application is currently in execution on a cellular phone A. When a train transfer guide application is called by the schedule application in execution, the application control means 12 of the cellular phone A detects the calling of the train transfer guide application and checks whether or not the train transfer guide application exists in the storage unit 13. It is assumed here that the train transfer guide application does not exist in the storage unit 13 of the cellular phone A and the process shifts to the download process for downloading the train transfer guide application.

The download source of the train transfer guide application is assumed in this example to become clear when the schedule application calls up the train transfer guide application by use of a URL. In the application download process, the application control means 12 of the cellular phone A downloads the train transfer guide application. After the download of the train transfer guide application, the calling relationship information is transmitted to the telecommunications carrier server via the communication means 11. FIG. 13 is an explanatory diagram showing an example of the calling relationship information transmitted to the telecommunications carrier server. In the example of FIG. 13, information that includes information on the calling application, information on the called application and the download source URL of the called application is transmitted as the calling relationship information.

The communication means 21 of the telecommunications carrier server updates the calling relationship statistical information DB 22 based on the received calling relationship information. The mechanism of the update process is as explained above. FIG. 14 shows an example of the information held by the calling relationship statistical information DB 22 after the update. In the example of FIG. 14, the information indicates that the number of downloads of the train transfer guide application caused by the calling of the train transfer guide application by the schedule application is 6 in statistics and the download source URL of the called application is "http://foo.bar.com/norikaeApp", for example. The information also indicates that not only the train transfer guide application but also a map application (the number of downloads=6) and a weather application (the number of downloads=3) are applications called up by the schedule application. The information also indicates that the number of downloads of an application B caused by the calling of the application B by an application A is 1 in statistics and the download source URL of the called application is "http://sample/bApp", for example.

Next, the application attribute generating process executed in the CP server will be explained. The communication means 31 of the CP server requests the telecommunications carrier server to supply the calling relationship statistical information related to the schedule application managed by the CP server. In this case, the communication means 31 transmits an ID (e.g., application name) of the schedule application to the telecommunications carrier server. In the telecommunications carrier server, the communication means 21 searches the calling relationship statistical information DB 22 based on the ID of the schedule application specified by the request. It is assumed here that pertinent calling relationship statistical information (calling relationship statistical information related to the schedule application) has been stored in the calling relationship statistical information DB 22. Since there exists the pertinent calling relationship statistical information in the telecommunications carrier server, the communication means 21 acquires the information and transmits the information to the requesting CP server.

FIG. 15 is an explanatory drawing showing an example of the calling relationship statistical information which is transmitted from the telecommunications carrier server to the CP server. In the example of FIG. 15, three records indicating the train transfer guide application, the map application and the weather application as the called applications are shown as the calling relationship statistical information having the schedule application as the calling application. Besides the above information on the called application, each record includes the download source URL and the number of downloads of the called application. The number of downloads of each called application is identical with the number explained above referring to FIG. 14.

In the CP server which received the calling relationship statistical information as the response to the request, the DB information analysis means 32 extracts the related applications based on the received calling relationship statistical information. The method for the extraction is as described above. Also in this example, the condition "the ratio of the number of downloads is 30% or more" is used as the condition for the extraction of the related applications. Referring to FIG. 15, the train transfer guide application (the ratio of the number of downloads=6/15=40%) and the map application (the ratio of the number of downloads=6/15=40%) satisfy the condition, and thus the two applications are extracted as the related applications of the schedule application. After the extraction of the related applications, the attribute generating means 33 of the CP server generates the attribute data of the schedule application (calling application) based on the information on the extracted related applications.

FIG. 16 is an explanatory drawing showing an example of the generated attribute data. About the application whose application name is "schedule application", the example of FIG. 16 shows that information indicating that the related applications are the "train transfer guide application" and the "map application" and the download source URLs of the related applications are "http://foo.bar.com/norikaeApp" and "http://foo.com/mapApp" has been provided (attached) as the attribute data.

Next, the application download process executed in a cellular phone B will be explained as an example of the usage of the attribute data generated as above. As already explained, due to the download of the train transfer guide application by the cellular phone A as the related application of the schedule application, the calling relationship statistical information is updated in the telecommunications carrier server and the attribute data regarding the schedule application is updated in the CP server managing the schedule application.

It is assumed in this example that the cellular phone B has thereafter downloaded the schedule application from the CP server according to a user operation (selection of the schedule application from a browser screen, etc.) and the communication means 11 of the cellular phone B has received the attribute data shown in FIG. 16 together with the main data of the schedule application.

In the cellular phone B, upon the reception of the schedule application and its attribute data by the communication means 11, the attribute analysis means 14 analyzes the received attribute data and thereby acquires the information on the related applications. Based on the acquired information on the related applications, the application control means 12 checks whether or not the related applications (the "train transfer guide application" and the "map application" in this example) exist in the storage unit 13. It is assumed here that neither of the related applications exists in the storage unit 13 and the cellular phone B shifts to the download process for downloading the related applications.

At the start of the related application download process, the output means 15 displays the download confirmation dialog to the user of the cellular phone B. FIG. 17 is an explanatory drawing showing an example of the related application download confirmation dialog (screen). In the example of FIG. 17, information on the related applications is presented together with selection boxes (check boxes) regarding the related applications. The application control means 12 executes the download of the related applications depending on the user's selection from the related application download confirmation dialog displayed by the output means 15. It is assumed in this example that the train transfer guide application has been selected in the confirmation step and has been downloaded.

When the communication means 11 of the cellular phone B transmits the download request for the train transfer guide application (related application), the communication means 11 also transmits information (via-server information), indicating that the cellular phone B has acquired the information on the related applications from the CP server managing the schedule application (hereinafter referred to as a "CP server A"), to the CP server delivering the train transfer guide application (hereinafter referred to as a "CP server B"). Incidentally, the communication means 11 may also send the aforementioned via-application information at this stage. FIG. 18 is an explanatory drawing showing an example of the via-server information transmitted in this example. In the example of FIG. 18, the via-server information, specifying the CP server A delivering the schedule application as the via-server, is attached by use of the HTTP request header by describing "Via:CPServer_A" in the request header.

Next, the billing process accompanying the above processes will be explained. It is assumed in this example that the billing server 4 is implemented by the management server 2, that is, the telecommunications carrier server serves also as the billing server 4.

Upon receiving the download request for the train transfer guide application from the cellular phone B, the communication means 31 of the CP server B recognizes, from the via-server information contained in the request, that the download is executed by use of the attribute data generated by the CP server delivering the schedule application (CP server A). Then, the communication means 31 of the CP server B transmits the reward information, indicating intention to pay 10% of the application price of the train transfer guide application (managed by the CP server B itself) as the reward to the CP server A, to the telecommunications carrier server.

The communication means 21 (also being the communication means 41) of the telecommunications carrier server receiving the reward information hands over the received reward information to the billing/remittance means 42. The billing/remittance means 42 bills the CP server B based on the reward information while also remitting the reward to the CP server A. The mechanism for the billing and remittance is as described in the second exemplary embodiment. While the telecommunications carrier server may get a profit margin, it is assumed here that the whole reward is remitted to the CP server A.

Further, since the CP server A generating the application attributes requested the calling relationship statistical information from the telecommunications carrier server, the communication means 31 of the CP server A transmits the usage fee information, indicating intention to pay the usage fee for the use of the calling relationship statistical information to the telecommunications carrier server, to the telecommunications carrier server (serving as the billing server 4). It is assumed in this example that a usage fee per reference has already been determined and the CP server A pays the determined fee to the telecommunications carrier server. The communication means 21 (communication means 41) of the telecommunications carrier server receiving the usage fee information hands over the received usage fee information to the billing/remittance means 42. The billing/remittance means 42 bills the CP server A based on the usage fee information. The mechanism for the billing is as described in the second exemplary embodiment.

As described above, in this example, the calling relationship among the applications in the cellular phone A (or in a great number of other cellular phones) is managed and shared by use of the telecommunications carrier server. Based on the shared information on the calling relationship (calling relationship statistical information), the CP server attaches the information on the related applications as attached data (attribute data) of an application managed by the CP server itself. Therefore, even the cellular phone B which has never executed the application yet is allowed to previously and easily figure out the related applications (e.g., applications having high probabilities of being activated next) and download the related applications.

Further, the application interoperability can be promoted by constructing the mechanism for the billing in the application interoperability.

In the following, the general outline of the present invention will be described. FIG. 19 is an explanatory drawing showing the general outline of the present invention. The download system in accordance with the present invention comprises two or more terminals 100, a management unit 200 and an application server 300.

The terminal 100 is an information processing terminal which downloads and executes applications or content data. The terminal 100 includes calling relationship transmission means 101 and download means 102. The management unit 200 is a server which is communicably connected to two or more terminals 100. The management unit 200 includes a calling relationship statistics storage unit 201. The application server 300 is a server which manages (stores) applications or content data. The application server 300 includes attribute generating means 301.

The calling relationship transmission means 101 (e.g., the communication means 11 and the application control means 12) transmits the calling relationship information, as information indicating the calling relationship regarding an application or content data executed by the terminal, to the management unit 200.

For example, the calling relationship transmission means 101 may transmit the calling relationship information indicating the calling relationship to the management unit in response to download of an application or content data when the application or content data is called up.

The download means 102 (e.g., the communication means 11 and the application control means 12) downloads an application or content data. The download means 102 further downloads an application or content data based on the attribute data generated by the attribute generating means 301 of the application server 300 which will be explained later.

The calling relationship statistics storage unit 201 (e.g., the calling relationship statistical information DB 22) stores the calling relationship statistical information as information representing statistics of the calling relationship among applications or content data indicated by the calling relationship information received from the terminals 100.

The attribute generating means 301 (e.g., the attribute generating means 33) generates the attribute data, including information representing applications or content data having high probabilities of being called up during the execution of an application or content data as related applications or related content data, for each application or content data managed by the application server 300 based on the calling relationship statistical information stored in the calling relationship statistics storage unit 201. Incidentally, the expression "(an application or content data) has a high probability of being called up" means that the probability of the calling of the application or content data, derived from the calling relationship statistics including the application or content data as the first caller (first calling application, first calling content data) indicated by the calling relationship statistical information, exceeds a prescribed probability.

For example, the attribute generating means 301 may generate attribute data that indicates applications or content data whose ratio of the number of downloads is a prescribed threshold value or higher, in the calling relationship statistics indicated by the calling relationship statistical information including the application or content data handled as the analysis target, as the related applications or related content data. Incidentally, in cases where the application server 300 includes statistical information analysis means 303 which will be explained later, it is also possible to make the statistical information analysis means 303 carry out the extraction of such related applications or related content data.

FIG. 20 is a block diagram showing another example of the configuration of the download system in accordance with the present invention. As shown in FIG. 20, each terminal 100 in the download system in accordance with the present invention may further include attribute analysis means 103 and display means 104. Further, the management unit 200 may further include calling relationship statistical information update means 202 and calling relationship statistical information transmission means 203. Furthermore, the application server 300 may further include calling relationship statistical information acquiring means 302 and the statistical information analysis means 303.

When an application or content data has been downloaded from the application server 300, the attribute analysis means 103 (e.g., the attribute analysis means 14) analyzes the attribute data attached to the application or content data and thereby extracts information on the related applications or related content data of the application or content data. In such cases, the download means 102 may download the related applications or related content data based on the information extracted by the attribute analysis means 103.

The display means 104 (e.g., the output means 15) displays information on the related applications or related content data when the related applications or related content data are downloaded.

The calling relationship statistical information update means 202 (e.g., the communication means 21) updates the calling relationship statistical information based on the calling relationship information received from the terminals.

The calling relationship statistical information transmission means 203 (e.g., the communication means 21) transmits calling relationship statistical information regarding specified application or content data, extracted from the calling relationship statistical information stored in the calling relationship statistics storage unit 201, in response to a request from the application server 300.

The calling relationship statistical information acquiring means 302 (e.g., the communication means 31) acquires the calling relationship statistical information on a management target application or management target content data of the application server 300 from the management unit 200. Incidentally, the calling relationship statistical information acquiring means 302 may request updated calling relationship statistical information upon receiving a notification of the update by the calling relationship statistical information update means 202 and acquire the (updated) calling relationship statistical information by receiving information as the response to the request. The calling relationship statistical information acquiring means 302 may also periodically request the calling relationship statistical information and acquire the calling relationship statistical information by receiving information as the response to the request.

The statistical information analysis means 303 (e.g., the DB information analysis means 32) analyzes the calling relationship statistical information acquired by the calling relationship statistical information acquiring means 302 and thereby extracts related applications or related content data. Specifically, the statistical information analysis means 303 extracts applications or content data having high probabilities of being called up during the execution of the application or content data, in the calling relationship statistics indicated by the calling relationship statistical information including the application or content data handled as the analysis target, as the related applications or related content data. For example, the statistical information analysis means 303 may extract applications or content data whose ratio of the number of times of calling is a prescribed threshold value or higher, in the calling relationship statistics indicated by the calling relationship statistical information including the application or content data handled as the analysis target, as the related applications or related content data.

In such a configuration equipped with the statistical information analysis means 303, the attribute generating means 301 may add information representing the related applications or related content data extracted by the statistical information analysis means 303 to the attribute data of the management target application or management target content data handled as the analysis target.

For example, the calling relationship information may include at least an identifier for identifying a calling application or content data and an identifier for identifying a called application or content data.

For example, the calling relationship statistical information may include at least an identifier for identifying a calling application or content data, an identifier for identifying a called application or content data, and the number of times of calling.

FIG. 21 is a block diagram showing another example of the configuration of the download system in accordance with the present invention. As shown in FIG. 21, the download system in accordance with the present invention may further comprise a billing server 400. The billing server 400 is a server for executing a billing process related to the application download. The billing server 400 includes reward/usage fee information reception means 401, billing means 402 and remittance means 403.

In the configuration equipped with the billing server 400, each terminal 100 may further include reporting means 105, and the application server 300 may further include reward/usage fee information transmission means 304.

When a related application or related content data has been downloaded based on information on the related application or related content data attached as the attribute data of an application or content data, the reporting means 105 (e.g., the communication means 11 and the application control means 12) sends information indicating the fact to the billing server 400 or the application server 300 managing the related application or related content data.

When the application server 300 has acquired the calling relationship statistical information stored in the management unit, the reward/usage fee information transmission means 304 (e.g., the communication means 31) transmits usage fee information, indicating that the application server 300 as a payer pays the usage fee for using the calling relationship statistical information to the management unit, to the billing server 400. Further, when a download request from a terminal 100 includes information on an application server that indicated the download target application or download target content data as a related application or related content data, for example, the reward/usage fee information transmission means 304 may transmit reward information, indicating intention to pay a reward to the application server, to the billing server 400.

The reward/usage fee information reception means 401 (e.g., the communication means 41) receives reward information, indicating the application server managing the downloaded related application or related content data as a payer and an application server managing the application or content data, to which the information indicating the related application or related content data has been attached as the attribute data, as a payment recipient, from a terminal 100 (specifically, the reporting means 105) or an application server 300 that received information from the terminal 100 (specifically, the reward/usage fee information transmission means 304).

The reward/usage fee information reception means 401 also receives the usage fee information, indicating that the application server 300 as the payer pays the usage fee for using the calling relationship statistical information to the management unit 200, from the application server 300 (specifically, the reward/usage fee information transmission means 304).

The billing means 402 executes the billing process to the application server 300 as the payer based on the reward information or the usage fee information.

The remittance means 403 executes the remittance process to the application server 300 or the management unit 200 as the payment recipient based on the reward information or the usage fee information. In this process, the remittance means 403 may also subtract a prescribed commission (percentage) from the reward or the usage fee.

While the present invention has been described above with reference to the exemplary embodiments and the example, the present invention is not to be restricted to the particular illustrative exemplary embodiments and example. A variety of modifications understandable to those skilled in the art can be made to the configuration and details of the present invention within the scope of the present invention.

This application claims priority to Japanese Patent Application No. 2009-74734 filed on Mar. 25, 2009, the entire disclosure of which is incorporated herein by reference.

INDUSTRIAL APPLICABILITY

The present invention is suitably applicable to purposes like the application interoperability function of mobile information communication terminals and the application download service.

REFERENCE SIGNS LIST

1 Terminal
11 Communication means,
12 Application control means
13 Storage unit
131 Application data (including attribute data)
14 Attribute analysis means
15 Output means
2 Management server
21 Communication means
22 Calling relationship statistical information DB
3, 3-A, 3-B Application server
31 Communication means
32 DB Information analysis means
33 Attribute generating means
34 Storage unit
341 Application data (including attribute data)
4 Billing server
41 Communication means
42 Billing/remittance means
43 Billing information DB
100 Information processing terminal (terminal)
101 Calling relationship transmission means
102 Download means
103 Attribute analysis means
104 Display means
105 Reporting means
200 Management unit
201 Calling relationship statistics storage means
202 Calling relationship statistical information update means
203 Calling relationship statistical information transmission means
300 Application server
301 Attribute generating means
302 Calling relationship statistical information acquiring means
303 Statistical information analysis means
304 Reward/usage fee information transmission means
400 Billing server
401 Reward/usage fee information reception means
402 Billing means
403 Remittance means

The invention claimed is:

1. A download system comprising two or more terminals downloading and executing applications or content data, a management unit communicably connected through a network to the terminals, and an application server managing applications or content data, wherein:
   each of the terminals includes:
      a calling relationship transmission unit which transmits calling relationship information, as information indicating calling relationship regarding an application or content data executed by own terminal, to the management unit; and
      a download unit which downloads an application or content data, and
   the management unit includes a calling relationship statistics storage unit which stores calling relationship statistical information as information representing statistics of the calling relationship among applications or content data indicated by the calling relationship information received from each of the terminals, and
   the application server includes an attribute generating unit which generates attribute data, including information representing applications or content data having high probabilities of being called up during the execution of an application or content data as related applications or related content data, for each application or content data managed by the application server based on the calling relationship statistical information stored in the calling relationship statistics storage unit, and
   the download unit further downloads an application or content data based on the attribute data generated by the attribute generating unit.

2. The download system according to claim 1, wherein:
   the calling relationship transmission unit transmits the calling relationship information indicating the calling relationship to the management unit in response to download of an application or content data when the application or content data is called up, and
   the management unit includes:
      a calling relationship statistical information update unit which updates the calling relationship statistical information based on the calling relationship information received from each of the terminals; and
      a calling relationship statistical information transmission unit which transmits calling relationship statistical information regarding specified application or content data, extracted from the calling relationship statistical information stored in the calling relationship statistics storage unit, in response to a request from the application server, and
   the application server includes:
      a calling relationship statistical information acquiring unit which acquires the calling relationship statistical information on an application or content data as a management target of the application server from the management unit; and
      a statistical information analysis unit which analyzes the calling relationship statistical information acquired by the calling relationship statistical information acquiring unit and thereby extracts applications or content data having high probabilities of being called up during the execution of the application or content data, in the calling relationship statistics indicated by the calling relationship statistical information including the application or content data handled as the analysis target, as the related applications or related content data, and
   the attribute generating unit adds information representing the related applications or related content data extracted by the statistical information analysis unit to the attribute data of the management target application or management target content data handled as the analysis target, and each of the terminals includes an attribute analysis unit which analyzes the attribute data attached to an application or content data when the application or content data has been downloaded from the application server and thereby extracts information on the related applications or related content data of the application or content data, and the download unit downloads a related application or related content data based on the information extracted by the attribute analysis unit.

3. The download system according to claim 1, wherein the attribute generating unit generates attribute data that indicates applications or content data whose ratio of the number of times of calling is a prescribed threshold value or higher, in the calling relationship statistics indicated by the calling relationship statistical information including the application or content data handled as the analysis target, as the related applications or related content data.

4. The download system according to claim 1, wherein the calling relationship information includes at least an identifier for identifying a calling application or content data and an identifier for identifying a called application or content data.

5. The download system according to claim 1, wherein the calling relationship statistical information includes at least an identifier for identifying a calling application or content data, an identifier for identifying a called application or content data, and the number of times of calling.

6. The download system according claim 1, wherein each of the terminals includes a display unit which displays information on the related applications or related content data when the related applications or related content data are downloaded.

7. The download system according to claim 1, further comprising a billing server which executes a billing process related to the application download, wherein:

each of the terminals includes a reporting unit and when a related application or related content data has been downloaded based on information on the related application or related content data attached as the attribute data of an application or content data, the reporting unit sends information indicating a fact of download to the billing server or the application server managing the related application or related content data, and the billing server includes:
a reward information reception unit which receives reward information, indicating the application server managing the downloaded related application or related content data as a payer and an application server managing the application or content data, to which the information indicating the related application or related content data has been attached as the attribute data, as a payment recipient, from the reporting unit of one of the terminals or the application server that received the information from the reporting unit of one of the terminals;

a billing unit which executes the billing process to the application server as the payer based on the reward information; and a remittance unit which executes a remittance process to the application server as the payment recipient based on the reward information.

8. The download system according to claim 1, wherein:
the application server includes a usage fee information transmission unit and when the application server has acquired the calling relationship statistical information stored in the management unit, the usage fee information transmission unit transmits usage fee information, indicating that the application server as a payer pays a usage fee for using the calling relationship statistical information to the management unit, to the billing server, and the billing server includes:
a usage fee information reception unit which receives the usage fee information from the application server;
a billing unit which executes a billing process to the application server as the payer based on the usage fee information; and
a remittance unit which executes a remittance process to the management unit as the payment recipient based on the usage fee information.

9. An information processing terminal downloading and executing applications or content data, comprising:

a calling relationship transmission unit which transmits calling relationship information indicating calling relationship regarding an application or content data to a prescribed management unit, communicably connected through a network to two or more terminals including the information processing terminal and storing calling relationship statistical information as information indicating statistics of the calling relationship among applications or content data indicated by the calling relationship information received from each of the terminals, in response to download of an application or content data when the application or content data is called up;

a download unit which downloads an application or content data from an application server managing the application or content data; and an attribute analysis unit which analyzes attribute data attached to the downloaded application or content data and thereby extracts related applications or related content data from the attribute data in cases where the attribute data is attribute data attached by an application server that attaches information, indicating applications or content data having high probabilities of being called up during the execution of the application or content data as the related applications or related content data, as the attribute data based on the calling relationship statistical information stored in the calling relationship statistics storage unit, wherein the download unit further downloads the related application or related content data extracted by the attribute analysis unit.

10. The information processing terminal according to claim 9, wherein when an application or content data called up by an application or content data has been downloaded due to nonexistence of the called application or content data in the information processing terminal, the calling relationship transmission unit transmits the calling relationship information indicating the calling relationship to the management unit.

11. The information processing terminal according to claim 9, further comprising a display unit which displays information on the related applications or related content data when the related applications or related content data are downloaded.

12. The information processing terminal according to claim 9, further comprising a reporting unit, wherein when a related application or related content data has been downloaded based on information on the related application or related content data attached as the attribute data of an application or content data, the reporting unit sends information indicating a fact of download to a prescribed billing server executing a billing process related to the application download or the application server managing the related application or related content data.

13. A management unit communicably connected through a network to two or more terminals downloading and executing applications or content data, comprising:
    a calling relationship statistics storage section which stores calling relationship statistical information as information representing statistics of calling relationship among applications or content data indicated by calling relationship information received from each of the terminals;
    a calling relationship statistical information update section which updates the calling relationship statistical information as the information representing the statistics of the calling relationship among applications or content data based on the calling relationship information received from each of the terminals; and
    a calling relationship statistics transmission section which transmits at least part of the calling relationship statistical information stored in the calling relationship statistics storage section to an application server managing an application or content data based on a request from the application server.

14. An application server managing applications or content data, comprising an attribute generating unit which generates attribute data, including information representing applications or content data having high probabilities of being called up during the execution of an application or content data as related applications or related content data, for each application or content data managed by the application server based on calling relationship statistical information which is stored in a prescribed management unit communicably connected through a network to two or more terminals as information indicating statistics of calling relationship among applications or content data indicated by calling relationship information received from each of the terminals.

15. The application server according to claim 14, further comprising:
    a calling relationship statistical information acquiring unit which acquires the calling relationship statistical information on an application or content data as a management target of the application server from the management unit; and
    a statistical information analysis unit which analyzes the calling relationship statistical information acquired by the calling relationship statistical information acquiring unit and thereby extracts applications or content data having high probabilities of being called up during the execution of the application or content data, in the calling relationship statistics indicated by the calling relationship statistical information including the application or content data handled as the analysis target, as the related applications or related content data,
    wherein the attribute generating unit adds information representing the related applications or related content data extracted by the statistical information analysis unit to the attribute data of the management target application or management target content data handled as the analysis target.

16. The application server according to claim 14, wherein the attribute generating unit generates attribute data that indicates applications or content data whose ratio of the number of times of calling is a prescribed threshold value or higher, in the calling relationship statistics indicated by the calling relationship statistical information including the application or content data handled as the analysis target, as the related applications or related content data.

17. The application server according to claim 14, further comprising a reward information transmission unit,
    wherein when a download request from one of the terminals includes information on an application server that indicated the application or content data handled as the target of the download as a related application or related content data, the reward information transmission unit transmits reward information, indicating intention to pay a reward to the application server, to a prescribed billing server which executes a billing process related to the application download.

18. The application server according to claim 14, further comprising a usage fee information transmission unit,
    wherein when the calling relationship statistical information managed by the management unit has been acquired, the usage fee information transmission unit transmits usage fee information, indicating intention to pay a usage fee for using the calling relationship statistical information to the management unit, to a prescribed billing server which executes a billing process related to the application download.

19. A billing server which executes a billing process related to application download, comprising:
    a reward information reception unit which receives reward information from a terminal that downloaded a related application or related content data based on information on the related application or related content data attached as attribute data of an application or content data or from an application server that acquired information indicating a fact of download from the terminal, the reward information indicating an application server managing the downloaded related application or related content data as a payer and an application server managing the application or content data, to which the information indicating the related application or related content data has been attached as the attribute data, as a payment recipient,
    a billing unit which executes the billing process to the application server as the payer based on the reward information; and
    a remittance unit which executes a remittance process to the application server as the payment recipient based on the reward information.

20. A billing server which executes a billing process related to application download, comprising:
    a usage fee information reception unit which receives usage fee information, indicating intention to pay a usage fee, for using calling relationship statistical information stored in a prescribed management unit communicably connected through a network to two or more terminals as information indicating statistics of calling relationship among applications or content data indicated by calling relationship information received from each of the terminals, to the management unit, from an application server;
    a billing unit which executes the billing process to the application server as a payer based on the usage fee information; and
    a remittance unit which executes a remittance process to the management unit as a payment recipient based on the usage fee information.

21. A download method for allowing a terminal to download an application or content data, wherein:
    each of two or more terminals transmit calling relationship information through a network, as information indicating calling relationship regarding an application or content data executed by its own terminal, to a management unit, and the management unit updates calling relationship statistical information as information indicating statistics of the calling relationship among applications or content data based on the calling relationship information received from each of the terminals, and an application server managing applications or content data generates attribute data, including information representing applications or content data having high probabilities of being called up during the execution of an application or content data as related applications or related content data, for each application or content data managed by the application server based on the calling relationship statistical information stored in the management unit, and the terminal further downloads an application or content data based on the attribute data generated by the application server.

22. The download method according to claim 21, wherein:

each terminal transmits the calling relationship information indicating the calling relationship to the management unit in response to download of an application or content data when the application or content data is called up, and the management unit transmits calling relationship statistical information regarding specified application or content data, extracted from the calling relationship statistical information stored in a calling relationship statistics storage unit, in response to a request from the application server, and the application server analyzes the calling relationship statistical information regarding a management target application or management target content data of the application server acquired from the management unit and thereby extracts applications or content data having high probabilities of being called up during the execution of the application or content data, in the calling relationship statistics indicated by the calling relationship statistical information including the application or content data handled as the analysis target, as the related applications or related content data, and the application server adds information representing the extracted related applications or related content data to the attribute data of the management target application or management target content data handled as the analysis target, and the terminal analyzes the attribute data attached to an application or content data when the application or content data has been downloaded from the application server, thereby extracts information on the related applications or related content data of the application or content data, and downloads the extracted related application or related content data.

23. The download method according to claim 21, wherein the application server generates attribute data that indicates applications or content data whose ratio of the number of times of calling is a prescribed threshold value or higher, in the calling relationship statistics indicated by the calling relationship statistical information including the application or content data handled as the analysis target, as the related applications or related content data.

24. The download method according to claim 21, wherein the terminal displays information on the related applications or related content data when the related applications or related content data are downloaded.

25. The download method according to claim 21, wherein:

when the terminal has downloaded a related application or related content data based on information on the related application or related content data attached as the attribute data of an application or content data, the terminal sends information indicating a fact of download to a prescribed billing server executing a billing process related to the application download or the application server managing the related application or related content data, and the billing server receives reward information, indicating the application server managing the downloaded related application or related content data as a payer and an application server managing the application or content data, to which the information indicating the related application or related content data has been attached as the attribute data, as a payment recipient, from the terminal or the application server that received the information from the terminal, and the billing server executes the billing process to the application server as the payer based on the reward information, and the billing server executes a remittance process to the application server as the payment recipient based on the reward information.

26. The download method according to claim 21, wherein:

when the application server has acquired the calling relationship statistical information stored in the management unit, the application server transmits usage fee information, indicating that the application server as a payer pays a usage fee for using the calling relationship statistical information to the management unit, to a prescribed billing server executing a billing process related to the application download, and the billing server receives the usage fee information from the application server, and the billing server executes the billing process to the application server as the payer based on the usage fee information, and the billing server executes a remittance process to the management unit as the payment recipient based on the usage fee information.

27. A non-transitory computer readable information recording medium storing a download program which, when executed by an information processing terminal which downloads and executes applications or content data, performs a method comprising:

transmitting calling relationship information indicating calling relationship regarding an application or content data to a prescribed management unit, communicably connected through a network to two or more terminals including the information processing terminal and storing calling relationship statistical information as information indicating statistics of the calling relationship among applications or content data indicated by the calling relationship information received from each of the terminals, in response to download of an application or content data when the application or content data is called up;

analyzing attribute data attached to an application or content data upon download of the application or content data from an application server managing applications or content data and thereby extracting related applications or related content data from the attribute data in cases where the attribute data is attribute data attached by an application server that attaches information, indicating applications or content data having high probabilities of being called up during the execution of the application or content data as the related applications or related content data, as the attribute data based on the calling relationship statistical information stored in the calling relationship statistics storage unit; and downloading the extracted related application or related content data.

28. The computer readable information recording medium according to claim 27, further comprising, when an application or content data called up by an application or content data has been downloaded due to nonexistence of the called application or content data in the information processing terminal, transmitting the calling relationship information indicating the calling relationship to the management unit.

29. The computer readable information recording medium according to claim 27, further comprising displaying information on the related applications or related content data when the related applications or related content data are downloaded.

30. The computer readable information recording medium according to claim 27, further comprising, when a related application or related content data has been downloaded based on information on the related application or related content data attached as the attribute data of an application or content data, sending information indicating the a fact of download to a prescribed billing server executing a billing process related to the application download or the application server managing the related application or related content data.

31. A non-transitory computer readable information recording medium storing a download program which, when executed by a management unit which is communicably connected through a network to two or more terminals downloading and executing applications or content data, and equipped with a calling relationship statistics storage unit which stores calling relationship statistical information as information representing statistics of calling relationship among applications or content data indicated by calling relationship information received from each of the terminals, performs a method comprising:

updating the calling relationship statistical information as the information representing the statistics of the calling relationship among applications or content data based on the calling relationship information received from each of the terminals; and transmitting at least part of the calling relationship statistical information stored in the calling relationship statistics storage unit to an application server managing an application or content data based on a request from the application server.

32. A non-transitory computer readable information recording medium storing a download program which, when executed by an application server which manages applications or content data, performs a method comprising generating attribute data, including information capable of identifying applications or content data having high probabilities of being called up during the execution of an application or content data, for each application or content data managed by the application server based on calling relationship statistical information which is stored in a prescribed management unit communicably connected through a network to two or more terminals as information indicating statistics of calling relationship among applications or content data indicated by calling relationship information received from the each of terminals.

33. The computer readable information recording medium according to claim 32, further comprising:

acquiring the calling relationship statistical information on an application or content data as a management target of the application server from the management unit;

analyzing the acquired calling relationship statistical information and thereby extracting applications or content data having high probabilities of being called up during the execution of the application or content data, in the calling relationship statistics indicated by the calling relationship statistical information including the application or content data handled as the analysis target, as the related applications or related content data; and adding information representing the extracted related applications or related content data to the attribute data of the management target application or management target content data handled as the analysis target.

34. The computer readable information recording medium according to claim 32, further comprising generating attribute data that indicates applications or content data whose ratio of the number of times of calling is a prescribed threshold value or higher, in the calling relationship statistics indicated by the calling relationship statistical information including the application or content data handled as the analysis target, as the related applications or related content data.

35. The computer readable information recording medium according to claim 32, further comprising, when a download request from a terminal includes information on an application server that indicated the application or content data handled as the target of the download as a related application or related content data, transmitting reward information, indicating intention to pay a reward to the application server, to a prescribed billing server which executes a billing process related to the application download.

36. The computer readable information recording medium according to claim 32, further comprising, when the calling relationship statistical information managed by the management unit has been acquired, transmitting usage fee information, indicating intention to pay a usage fee for using the calling relationship statistical information to the management unit, to a prescribed billing server which executes a billing process related to the application download.

* * * * *